United States Patent
Satoh

(10) Patent No.: US 6,963,462 B2
(45) Date of Patent: Nov. 8, 2005

(54) SERVO DETECTION CONTROL SYSTEM, SERVO DETECTION CONTROL METHOD AND HARD DISK DRIVE

(75) Inventor: Naoki Satoh, Odawara (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 511 days.

(21) Appl. No.: 10/077,782

(22) Filed: Feb. 20, 2002

(65) Prior Publication Data

US 2003/0007276 A1    Jan. 9, 2003

(30) Foreign Application Priority Data

Jul. 3, 2001    (JP) .............................. 2001-202374

(51) Int. Cl.[7] ............................................ G11B 15/12
(52) U.S. Cl. ........................ 360/63; 360/51; 360/77.04
(58) Field of Search ........................ 360/51, 63, 77.04, 360/77.08

(56) References Cited

U.S. PATENT DOCUMENTS 6,067,206 A * 5/2000 Hull et al. ................ 360/77.08
6,128,153 A * 10/2000 Hasegawa et al. ........ 360/77.08
6,515,813 B2 * 2/2003 Kitazaki et al. ............... 360/51
2001/0013984 A1 * 8/2001 Takaishi ....................... 360/51

* cited by examiner

Primary Examiner—David Hudspeth
Assistant Examiner—Dan I Davidson
(74) Attorney, Agent, or Firm—Antonelli, Terry, Stout & Kraus, LLP.

(57) ABSTRACT

For the purpose of providing technique by which even when large skew of a disk or a head occurs due to a thermal shock, an outside shock, or the like, a servo signal area is not extended, and a performance loss caused by head change is not produced, a servo detection control system according to the present invention comprises: a learning means by head change including a servo sector interval measuring unit for measuring an interval of servo signal areas, which may occur at the time of head change among a plurality of heads; a time difference calculating unit for calculating head-change time difference from a value measured by the servo sector interval measuring unit; and a time difference storage unit for storing a result of calculation made by the time difference calculating unit; and a compensation and control means for compensating start timing of servo detection after head change using a stored value of the time difference storage unit. In addition, the amount of head skew in a disk radius direction is measured using a writing signal in a servo sector after head change; and positioning of feed-forward of a head is controlled using the amount of head skew.

16 Claims, 18 Drawing Sheets

APPLICATION OF ONE PRE-STW DISK BY MEDIA PREWRITE STW

CONFIGURATION OF HDA

CONFIGURATION OF HDD

TWO DISKS BUILT INTO MOBILE COMPUTING DEVICE

SERVO DETECTION CONTROL SYSTEM, SERVO DETECTION CONTROL METHOD AND HARD DISK DRIVE

BACKGROUND OF THE INVENTION

The present invention relates to a control technique of servo signal detection in which even if relative positional relation of a plurality of heads, which are built into a hard disk drive, with a servo signal area of a disk corresponding to each of the heads deviates, performance of the hard disk drive does not decrease.

In recent years, for the hard disk drive (HDD), a magneto-resistive (MR) head and a giant magneto-resistive (GMR) head are adopted as a magnetic head, which results in sharply increased recording density of the drive. Concerning the magneto-resistive head and the giant magneto-resistive head, in order to increase detection sensitivity, a R/W IC supplies an electric current having high density to a thin film sensor having magnetoresistance for use. For this reason, as preventive measures against electro-migration of a head sensor, data placement (data format) is performed so that usually an electric current is not supplied to one head for a long time continuously, and so that operation for switching a head (head change) is performed comparatively frequently.

In addition, as recording density of data becomes high, recording density of a servo signal area in a disk circumference direction becomes higher. An area length of a servo signal area in a disk circumference direction tends to be narrowed. A length of a servo signal area is currently several tens of $\mu$m per area. Additionally, in order to improve positioning performance, it is important to widen a servo detection frequency band width. Therefore, it is necessary to increase the number of servo signal areas per circuit.

Under the circumstances, as a servo signal area is narrowed, and as the number of servo signal areas per circuit increases, the following problem arises: when head change occurs, detection timing deviates from an expected servo signal area. To be more specific, as shown in FIGS. 13(A) and 13(B), a spindle leans due to change in thermal environment of HDD and an outside shock (for example, a center of an actuator shaft inclines, causing a position gap between a head #0 and a head #7 of an actuator); and distortion caused by a clamp (a spindle fixture, not illustrated) of the disk is released by a heat history or an outside shock, resulting in a slip in a circumference direction of the disk.

Because of it, if a servo signal area deviates from an expected area at the time of head change, a timing gap (skew) occurs. To be more specific, at the time of head change, if a servo signal area of a track corresponding to a head after change deviates from that before the change as shown in FIGS. 13(A) and 13(B), proper detection timing of the servo signal area after the change deviates. As a result, normal servo detection cannot be expected. Moreover, there is a high possibility that performance is extremely decreased due to frequent retry processing.

In order to avoid such problems caused by skew of a servo signal area 13, as shown in FIGS. 13(A) and 13(B), the following measures are taken: a technique for adding an area corresponding to the relatively possible amount of head skew to a position before the servo signal area 13, as an increment 18 of the servo signal area; eliminating distortion of a clamp by adding a sufficient heat history before writing a servo signal on the disk by a STW (servo track writer); and the like.

The former example of measures for avoiding the problems of skew (the example in which the increment of the servo signal area is added) will be described more specifically. As shown in FIGS. 13(A) and 13(B), if it is based on the assumption that a lean range 17 is ±15 $\mu$m for the head #7 (H7) (30 $\mu$m for a width), an acquisition signal of 30 $\mu$m for a servo signal is added as an increment 18 before all servo signal areas 13 of all heads. Then, as is the case with SGATE (control signal for detecting a servo signal) 19-1, 19-2, it is always detected while moving forward by 15 $\mu$m. As shown in FIGS. 13(A) and 13(B), if H7 deviates by 15 $\mu$m, when performing head change from H7 to H0, SGATE 19-1 opens at the top of an increment area of H0; and when performing head change from H0 to H7, SGATE 19-2 opens at the end of an increment area of H7. Therefore, servo detection for both becomes possible without hindrance.

If it is described at full length with reference to FIG. 13(B), as measures against a shift of a head (or a disk) in a track direction on the upper and the lower sides, the increment 18 of the servo signal area is additionally written in all tracks so that it is adjacent to the original servo signal area 13. In this case, in order to read a servo signal in the servo signal area 13 or in the increment 18, it is so devised that a servo gate signal (indicated as 19-1 or 19-2 in FIG. 13(B)) is opened to distinguish the servo signal from data before reading the servo signal. In FIG. 13(B), for example, an increment having a length of 30 $\mu$m is a length for which the forward and backward shifts with reference to the track direction (circumference direction of the disk) are taken into consideration. In actuality, it is either a forward shift or a backward shift with reference to the track direction. Therefore, it is so devised that a servo gate (indicated as SGATE in the figure) is opened in a substantially central part of the increment 18 to cope with shifts in both directions.

In addition to it, in the above description, the head change from H7 to H0 was assumed to be a change to a servo signal area written on the same radius of the disk. However, the head change is not limited to this. As a matter of course, the head change may be a change to the next servo signal area that is separated by one data block (actually, in many cases, only an interval T between servo signal areas is offset to perform a head change).

As described above, providing the servo signal area increment 18, and adjusting timing of a servo gate, prevent a timing gap from occurring at the time of a head change.

SUMMARY OF THE INVENTION

In the prior art, with the increase of the number of servo signal areas per circuit, the following new problem arises: if a ratio of an area corresponding to the highest possible amount of head skew (for example, an increment of a servo signal area) increases, a data recording area is narrowed (it is called format loss).

As a result of the addition of the increment area 18 to cope with skew, if there are 100 servo signal areas in one circuit of a 2.5-inch disk, a format loss for the innermost side is about 3%; and if there are 200 servo signal areas in one circuit of a 3.0-inch disk, a format loss is equivalent to about 5%.

With HDDs used for mobile information devices, low power consumption is required, and for this purpose, it is desirable to be applied in low rotation speeds. From this point of view, as notebook PC use, if operation of the HDD at 2,000 rpm is tried in spite of usual use at 4,200 rpm, the number of servos required to reserve a frequency band width for a servo positioning response increases by 2.1 times (4,200/2,000=2.1). If the number of servos is 210 per circuit, and if lean of ±15 $\mu$m is allowed, a format loss exceeds 6%.

As regards a HDD that uses a disk with a small diameter, a loss increases in inverse proportion to a size of a diameter. As regards a 1.0-inch disk, on the assumption that rotation speed is 2,000 rpm, and that the number of servos is 210 per circuit, a format loss reaches 16% if lean of ±15 μm is allowed.

Moreover, if skew exceeding ½ of the increment 18, which is used to cope with skew, occurs from some cause (according to the example in FIGS. 13(A) and 13(B), if a forward or a backward shift in a track direction in a head or a disk exceeds 30 μm/2), servo detection of a servo signal area becomes abnormal for each head change, which causes a retry frequently, resulting in a large performance loss.

As described above, in the prior art as show in FIGS. 13(A) and 13(B), the following problems may occur: reduction of a data area caused by adding an increment of a servo signal area; and an abnormal condition of servo detection caused by occurrence of skew exceeding a half of an increment of a servo signal area.

In order to solve the problems, the present invention mainly adopts configurations as follows.

According to one aspect of the present invention, there is provided a servo detection control system that is used when writing and reading information by head change operation among a plurality of heads, said servo detection control system comprising: a learning means by head change including a servo sector interval measuring unit for measuring an interval of servo signal areas, which may occur at the time of head change among a plurality of heads; a time difference calculating unit for calculating head-change time difference from a value measured by the servo sector interval measuring unit; and a time difference storage unit for storing a result of calculation made by the time difference calculating unit; and a compensation control means for compensating start timing of servo detection after head change using a stored value of the time difference storage unit.

In addition, according to another aspect of the present invention, there is provided a servo detection control system that is used when writing and reading information by head change operation among a plurality of heads, said servo detection control system comprising: a learning means by head change comprising the steps of measuring a servo sector interval, which may occur at the time of head change among a plurality of heads, and measuring the amount of head skew in a disk radius direction using a writing signal in a servo sector after head change; calculating head-change time difference from a measured value of the servo sector interval; and storing the calculated time difference and the measured amount of head skew; and a head-change compensation and control means that compensates and controls start timing of servo detection after head change using the stored value of the time difference, and that controls positioning of feed-forward of a head using the amount of head skew.

In addition, according to still another aspect of the present invention, there is provided a servo detection control system that is used when writing and reading information by head change operation among a plurality of heads, said servo detection control system comprising: a learning means by head change comprising the steps of measuring a servo sector interval, which may occur at the time of head change among a plurality of heads, and measuring the amount of servo sector skew using a servo sector address after head change; calculating head-change time difference from a measured value of the servo sector interval; and storing the calculated time difference and the amount of servo sector skew; and a head-change compensation and control means that compensates and controls start timing of servo detection after head change using the stored value of the time difference, and that compensates and controls a servo sector address using the amount of servo sector skew.

Moreover, according to the present invention, there is provided a servo detection control system, wherein during learning operation by the learning means by head change, and during compensation control operation by the head-change compensation control means, a continuous search mode is applied without using an usual servo detection mode.

DESCRIPTION OF THE PREFERRED EMBODIMENTS

Figure 1:
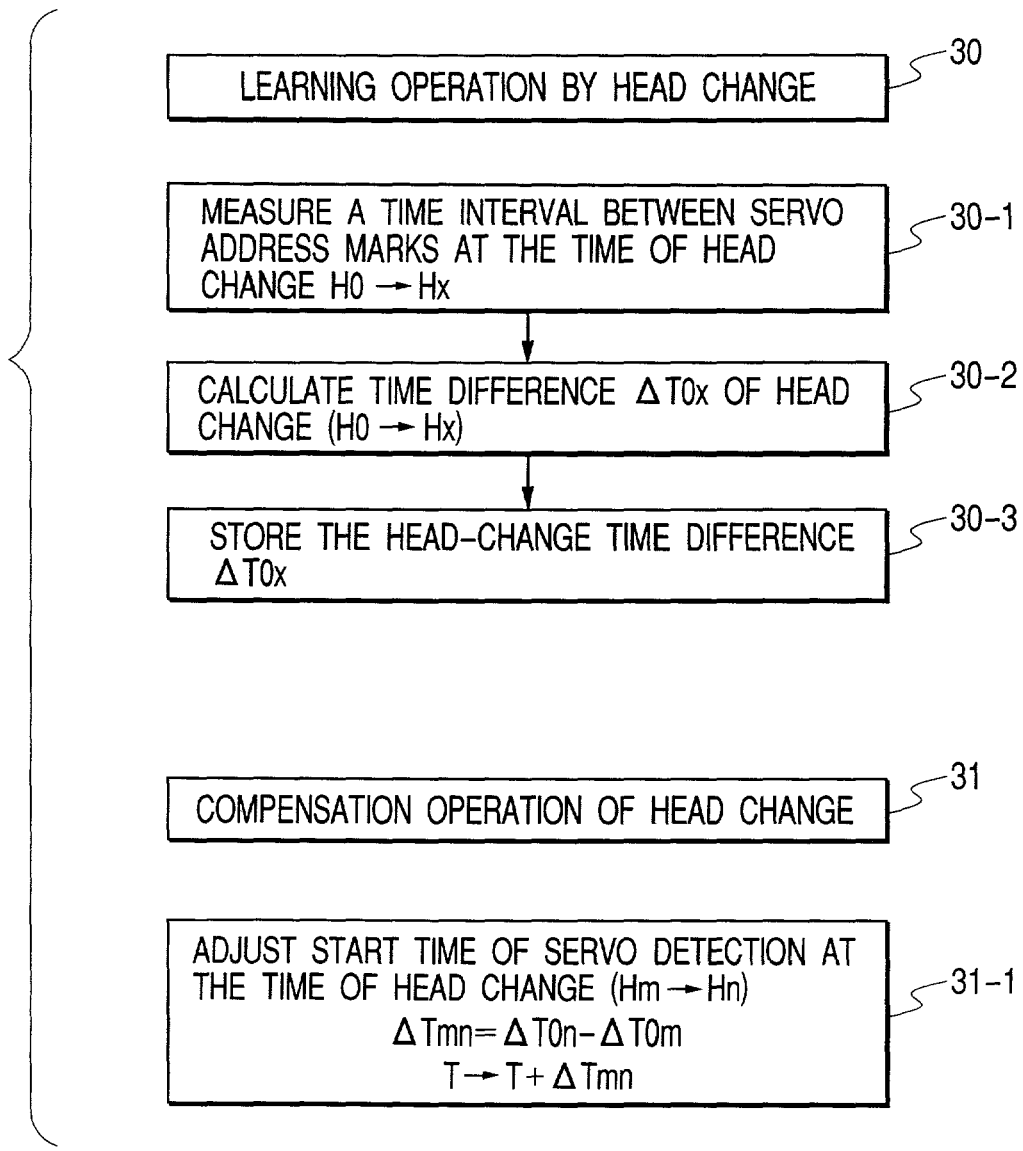
FIG. 1 is a flowchart illustrating learning of the amount of head skew of a servo signal area according to an embodiment of the present invention.
Figure 2:
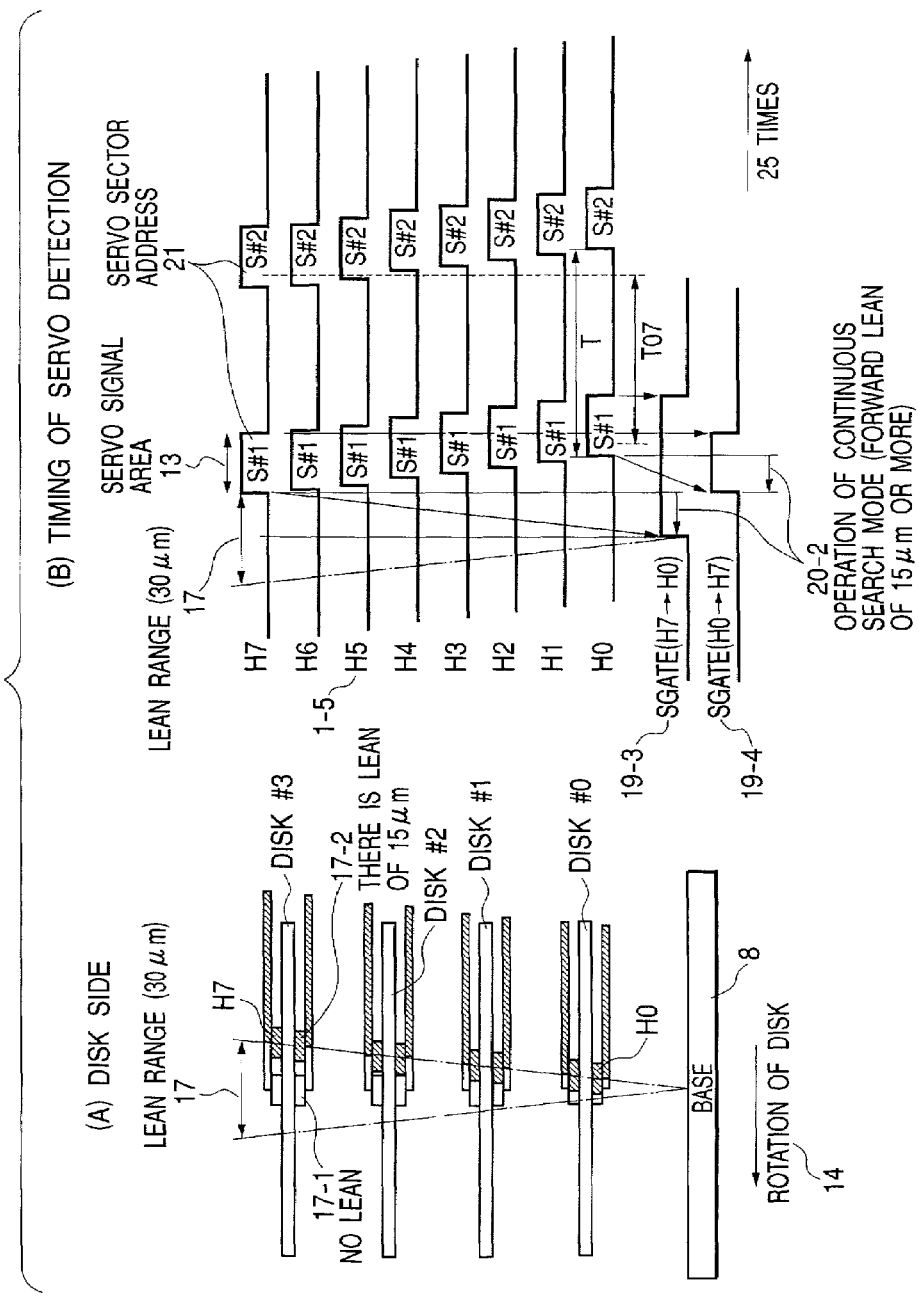
FIGS. 2(A) and 2(B) are diagrams illustrating a skew state of a head or a disk, and timing of servo detection, according to the embodiment of the present invention.

A servo detection control system, which is applied to a hard disk drive according to embodiments of the present invention, will be described with reference to drawings. FIG. 1 is a flowchart illustrating learning of the amount of head skew of a servo signal area according to an embodiment of the present invention. FIGS. 2(A) and 2(B) are diagrams illustrating a skew state of a head or a disk, and timing of servo detection, according to the embodiment.

Figure 11:
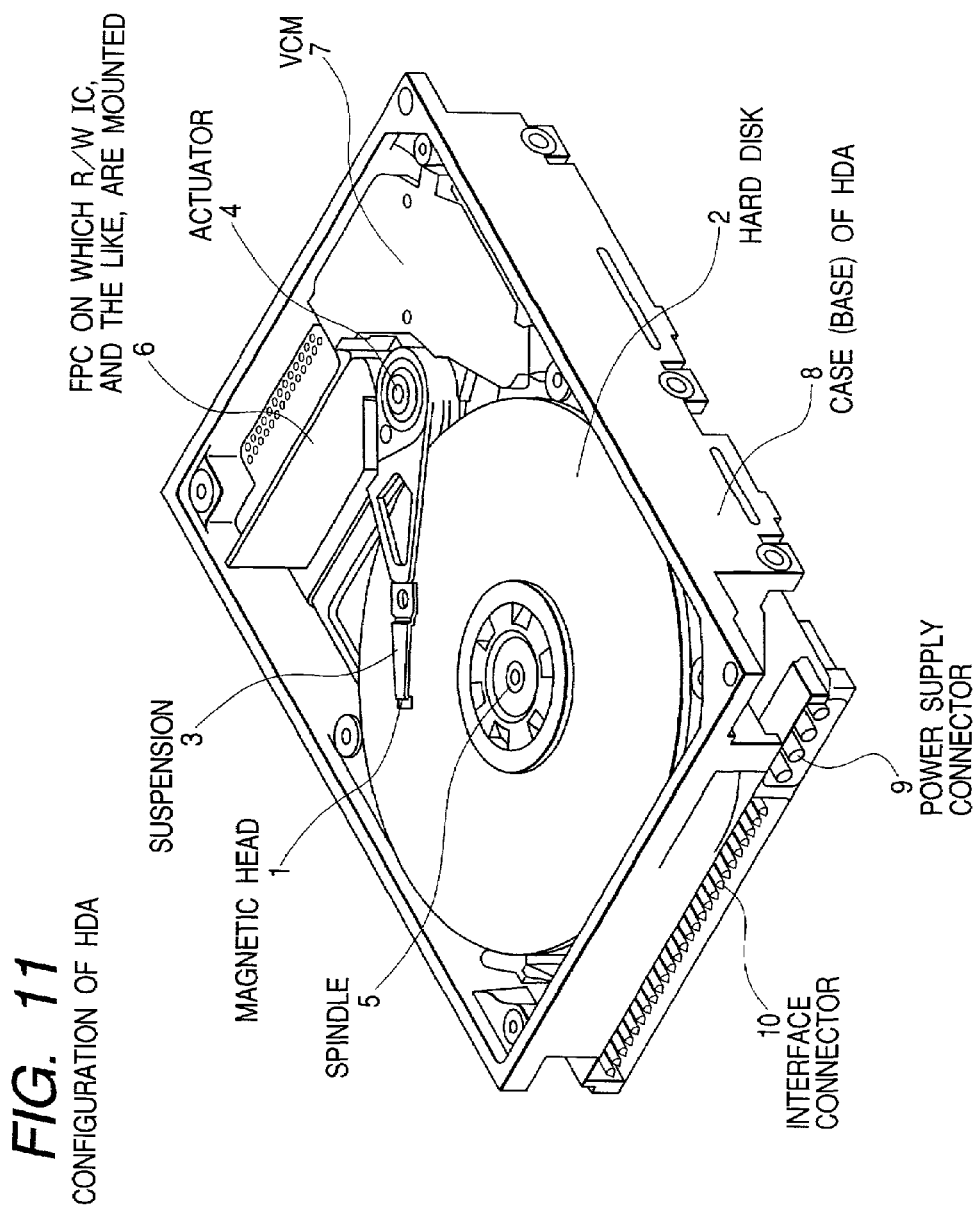
FIG. 11 is an actual state diagram illustrating a configuration of a head disk assembly (HDA)
Figure 12:
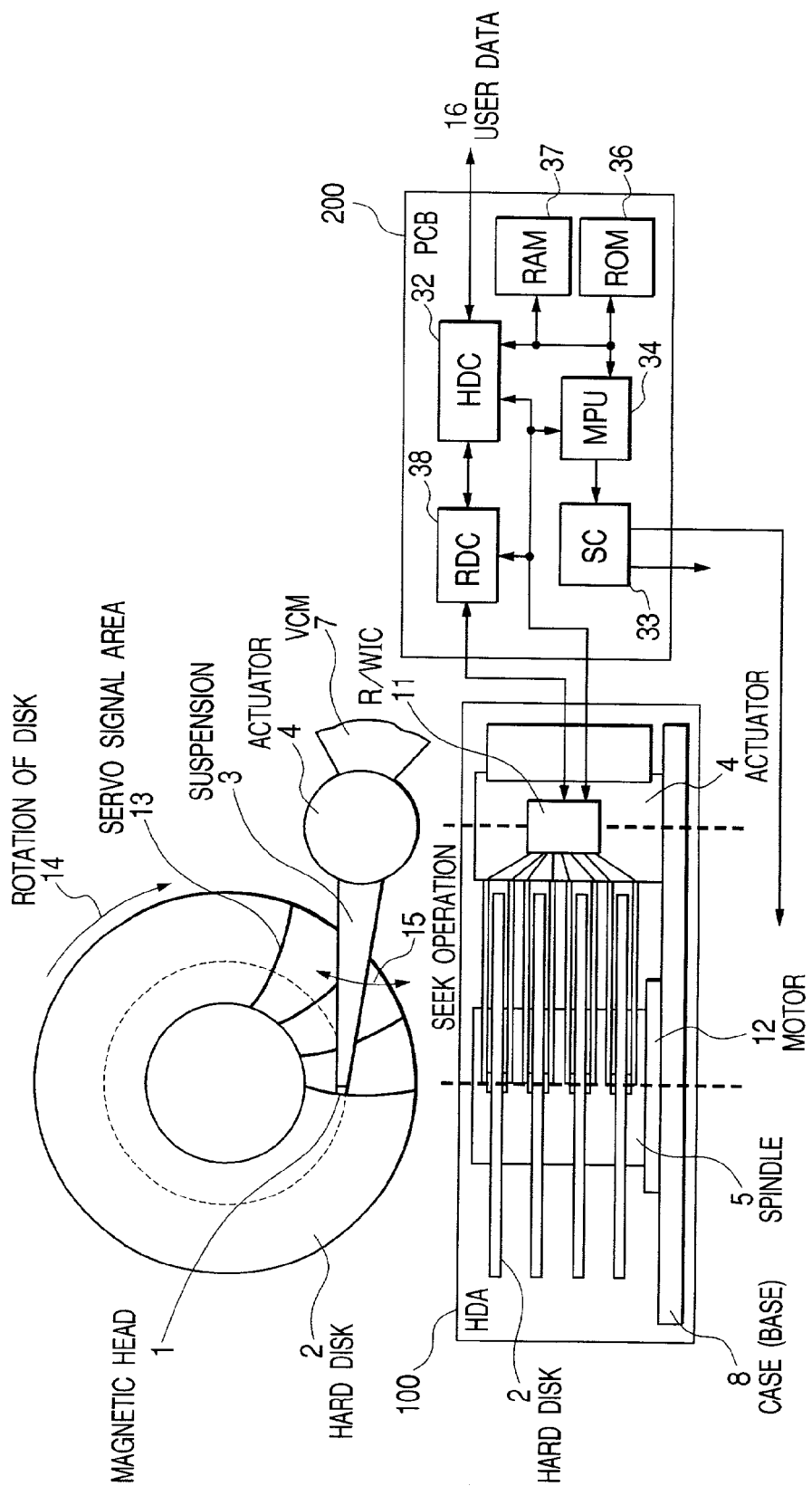
FIG. 12 is a configuration diagram of a hard disk drive (HDD)
Figure 13:
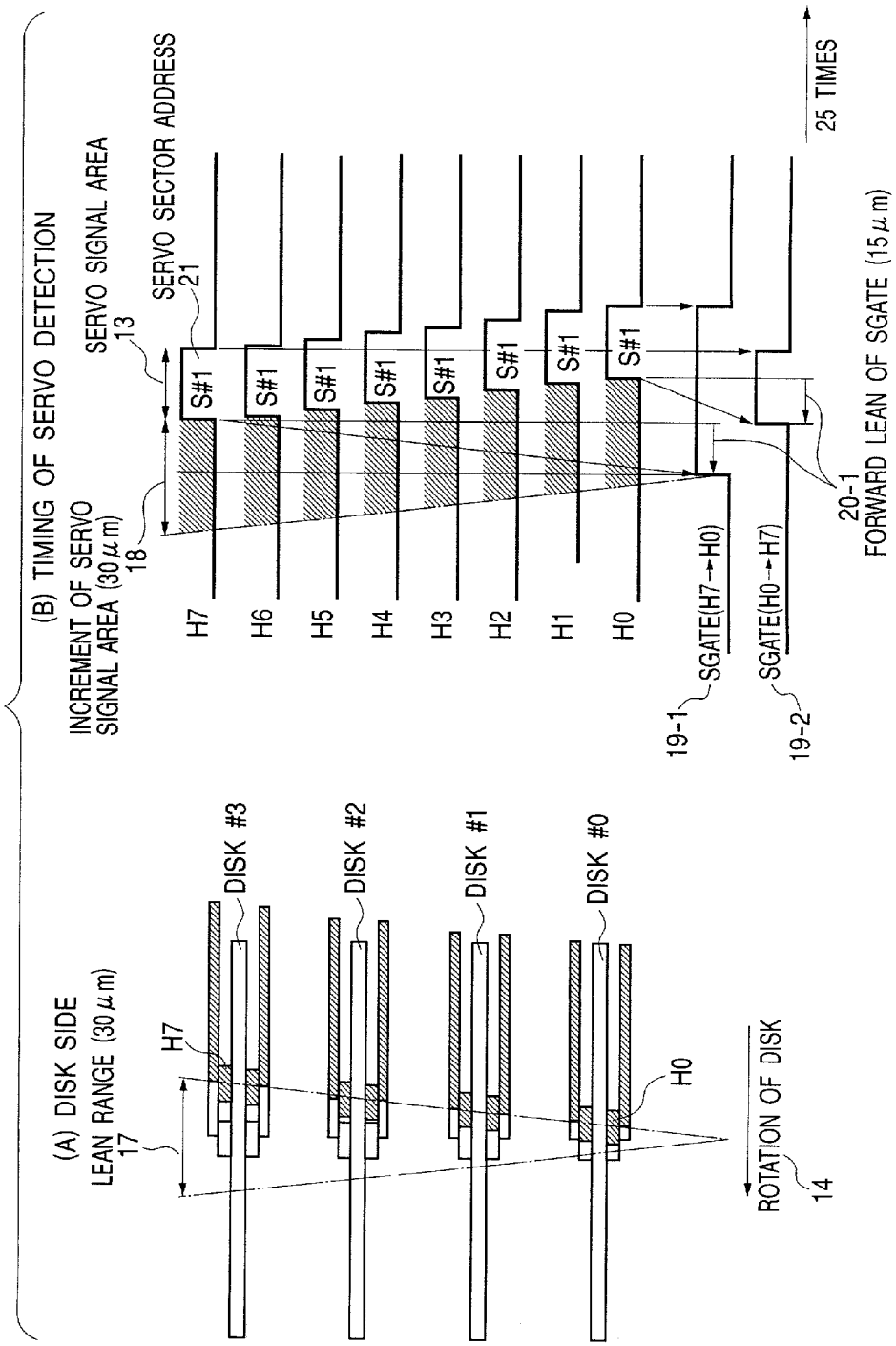
FIGS. 13(A) and 13(B) are diagrams illustrating a technique for absorbing spindle lean according to the prior art.

A general configuration of a hard disk drive will be described with reference to FIGS. 11 and 12. A hard disk drive (HDD) comprises a head disk assembly (HDA) mainly comprising a mechanical system; and a printed circuit board (PCB) mainly comprising a circuit system. FIG. 11 illustrates a configuration of a head disk assembly (HDA) 100. FIG. 12 illustrates a configuration of a hard disk drive (HDD).

In FIG. 11, the HDA 100 comprises the following: a hard disk 2 that is built into a case (base) 8 using a spindle 5; a magnetic head 1 mounted at a tip of a suspension 3 that is connected to an actuator 4 driven by a voice coil motor (VCM) 7; and a flexible printed cable (FPC) 6 on which a read/write IC (R/W IC) 11 for electrically driving the magnetic head 1 is mounted. The HDD writes and reads at an arbitrary position while rotating the hard disk 2 at the fixed number of revolutions to move the magnetic head 1 by the actuator 4.

In FIG. 12, the HDA 100 is constituted of four hard disks 2. A signal of a servo signal area 13, which has been read by the magnetic head 1, is amplified by the R/W IC 11. Then, servo detection of the signal is performed in a servo detection circuit of a Read Channel IC (RDC) 38 of a PCB 200. According to a result of the servo detection, a microprocessor (MPU) 34 identifies a position of the magnetic head 1, and controls a servo controller (SC) 33. According to the control, the SC 33 controls rotation 14 of a disk accurately by means of rotation control of a motor 12. In addition to it, the SC 33 controls electric current of the VCM 7 of the actuator 4 to control seek operation 15 and track following operation.

As soon as the magnetic head 1 is positioned in an area where it is possible to write and read, a HDC (a hard disk controller) 32 instructs the RDC 38 and the R/W IC 11 to perform write/read control. At the time of writing, an error correction code (ECC) is added to a value of a RAM 37, in which user data 16 has been read through the HDC 32, before the value is written into a given area of the hard disk 2. At the time of reading, the RDC 38 decodes a magnetizing signal, which has been read from the magnetic head 1 located at a given position, into digital data. Moreover, the HDC 32 checks and corrects an error, and records the data in the RAM 37, and then notifies a upper level that reading has been successfully completed. A ROM 36 records a sequence used when starting up the hard disk 2, and information required to read a system data area of the hard disk.

By the way, as regards a hard disk drive, "actuator lean" and "spindle lean", which are found in a large-capacity multiple-disk HDD used for a desktop PC or a server, are predicted. If a hard disk drive has a plurality of built-in disks, the lean as described in "Background of the Invention" causes a phenomenon that a servo signal area differs among disks (or heads).

To be more specific, as shown in FIG. 2(A), if multiple disks are used (in the figure, four disks), it is assumed that change in environmental temperature, application of an outside shock, etc. causes an actuator, to which a head is mounted, to be inclined 15 $\mu$m at H7 with reference to a motor shaft of the HDA (a lean range 17= 30 $\mu$m: if lean from the head to the actuator is 15 $\mu$m in one direction along a circumference of a disk, lean of 15 $\mu$m in the reverse direction is also predicted, which means that a total lean range is 30 $\mu$m).

In FIG. 2(B), for example, a lean range of 30 $\mu$m is a length for which forward and backward lean (skew) along a track (circumference direction of a disk) are taken into consideration. In actuality, it is either forward skew or backward skew along the track. Therefore, it is so devised that a servo gate (19-3 SGATE in the figure) is opened in a substantially central part of the lean range 17 to cope with skew in both directions.

In such a state, as shown in a timing chart of FIG. 2(B), at the time of head change between heads apart from each other (for example, from a head 7 (H7) to a head 0 (H0)), there is no servo signal area 13 in expected timing. Because of it, servo detection is started in a data area (SGATE 19-3), causing abnormal operation, which forces retry processing. Such abnormal operation is also caused by lean of the spindle 5, to which the disk 2 is mounted, from a proper axis.

In order to avoid the problem caused by skew of this servo signal area 13, a continuous search mode (mode used when the servo signal area 13 is lost in some abnormal condition) is usually applied as retry processing. In this case, the continuous search mode corresponds to a usual servo detection mode. The continuous search mode is an operation mode in which an abnormal condition of operation seldom occurs even if servo detection operation is started in a data area when the servo signal area 13 cannot be identified due to start-up of a hard disk drive, or the like. The continuous search mode is also applied to start-up of rotation of the disk 2. In addition, the usual servo detection mode has a feature in that although servo detection operation cannot be started up in a data area (in the usual servo detection mode, if an AGC/PLL portion in the servo signal area 13 cannot be detected immediately, abnormal operation occurs), malfunction seldom occurs in the proper servo signal area 13. Even if the servo signal area 13 is lost due to some cause, if this continuous search mode is applied, the servo signal area 13 can be identified again. Therefore, when the lost servo signal area 13 is identified, it is possible to cope with this by changing the continuous search mode to the usual servo detection mode.

In the embodiment of the present invention, by utilizing this continuous search mode, the amount of head skew of the servo signal area 13 between heads (the amount of deviation in each servo signal area corresponding to each head) is learned as a sequence of HDD start-up or retry processing. Then, a result of the learning is applied to the usual servo detection operation to perform head change. In this case, the servo signal area comprises an AGC/PLL portion, a SAM (a servo address mark) portion, a GrayCode portion, and a PES (position error signal) portion.

In the first place, an outline of the embodiment of the present invention will be describes with reference to FIG. 2(B) as below. When performing head change from H7 to H0, 19-3 SGATE is opened in timing shown in the figure (it is turned on at a half of the lean range (30 $\mu$m)). Keeping the continuous search mode operation only for a period of 15 $\mu$m after that can prevent abnormal operation although H7 is a data area. Subsequently, a servo signal area is detected while H7 is in continuous search mode operation, as a result of which, preparation for changing to H0 has been completed.

Then, a time interval $T_{07}$ between a servo address mark (SAM) of the servo signal area of H7 and SAM of the next servo signal area of H0 is determined beforehand. After that, head change is performed after a lapse of the time interval $T_{07}$ since the SAM of H7 is detected. As a result, the head can detect the SAM of the next servo signal area of H0, and can achieve normal servo control at H0 after head change (this is a case where servo control is performed by skipping one data area in H0). Moreover, determining $\Delta T_{07}=T_{07}-T$ (T is a period of a servo signal area) in addition to $T_{07}$, and performing head change after a lapse of the time interval $\Delta T_{07}$ since the SAM of H7 is detected, permit the head to detect the SAM of the servo signal area of H0 (in this case, a continuous servo signal area between heads can be detected without skipping a data area).

In order to embodying the outline of this embodiment as described above, the following specific technique is used. In the first place, as shown in a flowchart of FIG. 1, the specific technique includes the following operation. First, learning operation comprising the steps of: measuring time $T_{0x}$ between servo address marks at the time of head change between a head (H0) on a base side and each head (Hx) (30-1); calculating head-change time difference between the two heads ($\Delta T_{0x}=T_{0x}-T$) (30-2); and storing the head-change time difference between the heads (30-3). Secondly, compensation operation at the time of head change (31) comprising the steps of: adjusting start time of servo detection to which results of the learning are applied (31-1); and the like.

In this case, the means for measuring time between servo address marks (30-1) measures the time interval ($T_{0x}$) between servo address mark detection time, which shows a servo signal area in a reading head (H0) on the base side, and servo address mark detection time, which shows a servo signal area in an arbitrary reading head (Hx), using the continuous search mode when changing a head from the reading head (H0) on the base side to the arbitrary reading head (Hx). A half of a lean width, which is assumed to be largest, is desirable for the continuous search mode applied at this time. In this connection, in this case, it is based on the assumption that a starting point of head change is the head (H0) on the base side. However, even a head on a cover side or a head at a central part may be used as the starting point.

The means for calculating head-change time difference (30-2) calculates time difference ($\Delta T_{0x}=T_{0x}-T$) between a measured value ($T_{0x}$), which is measured by the means for measuring time between servo address marks (30-1), and an expected value (designed value) (T) of a time interval of servo address mark detection in the same head (for example, reading head (H0) on the base side). It is to be noted that if the servo address mark (SAM) of the servo signal area 13 after head change is not found due to a defect, etc., up to a plurality of servo signal areas before the servo address mark is found may be detected in the continuous search mode to determine $\Delta T_0=MOD_T(T_{0x})$ (indicating $T_{0x}/T$) using time ($T_{0x}$) until the found servo address mark. In this case, an operator $MOD_Y(X)$ indicates the remainder after X is divided by Y. In this connection, MOD expresses modulo.

The means for storing head-change time difference (30-3) stores $\Delta T_{0x}$, which has been determined in the step 30-2 described above.

In this case, head-change time difference ($\Delta Tmn$) between two arbitrary heads (Hm and Hn) may be calculated using $\Delta T_{0x}$, according to an estimation profile of the amount of head skew, to store its result. In particular, if the number of heads and the number of disks are small, operation means, which will be described below, can be omitted. Moreover, the means for storing head-change time difference between heads requires compensation in a reverse direction depending on a head change direction. Therefore, even if the operation means is not used, it is not necessary to store head-change time difference for all between-heads. In this case, ½ will suffice. For example, if the number of heads is four, six ($4C_2/2$) memories ($\Delta T_{01}$, $\Delta T_{12}$, $\Delta T_{23}$, $\Delta T_{30}$, $\Delta T_{02}$, $\Delta T_{13}$) will suffice.

In this connection, measuring only $\Delta T_{0x}$ between two points, and applying linear approximation to $\Delta T_{0x}$ as an estimation profile, permit measurement to be simplified.

Figure 3:
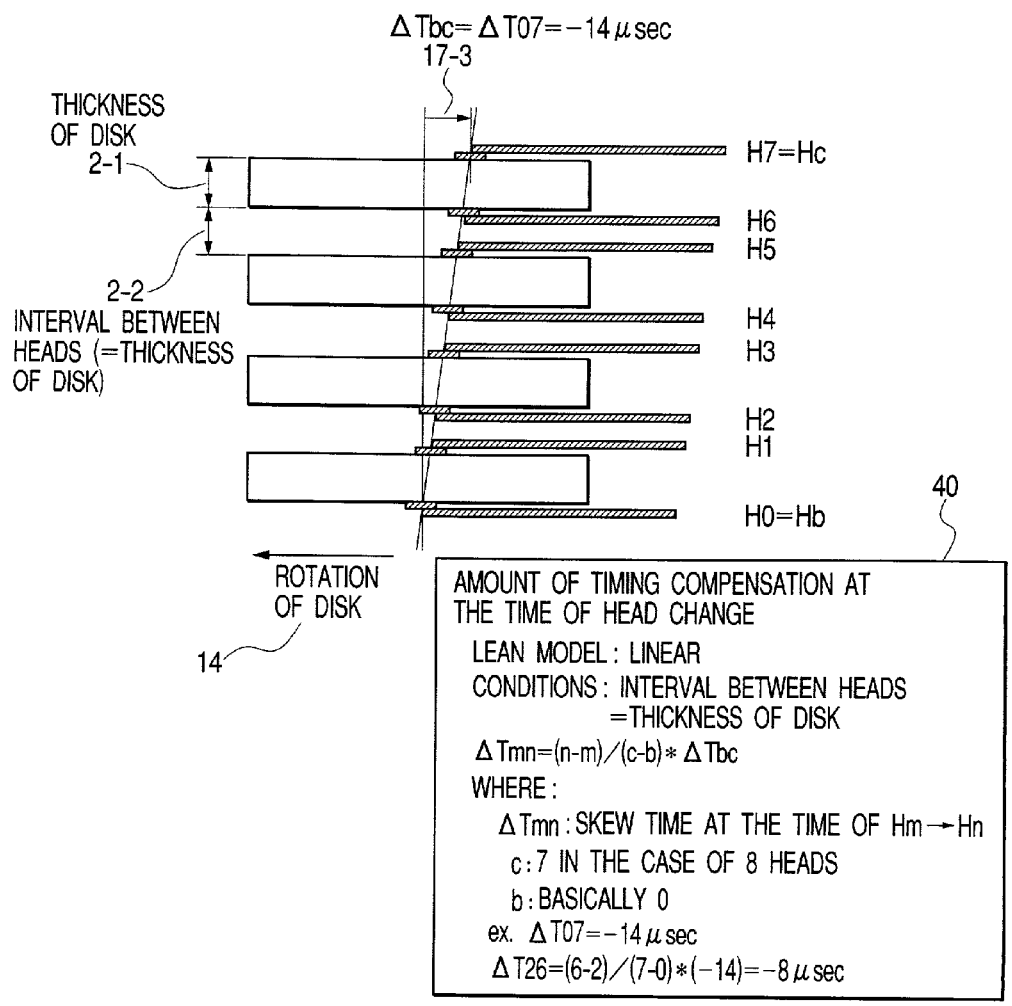
FIG. 3 is a diagram illustrating timing compensation, where actuator lean or spindle lean is expressed by a linear model.

For example, as shown in FIG. 3, on the assumption that an actuator has leaned between a head on the base side (H0=Hb) and a head on the case side (H7=Hc) rectilinearly (an estimation profile of the amount of head skew), if an interval 2-1 in a HDA thickness direction of the head (a thickness of a disk) is equivalent to a disk interval 2-2, head-change time difference between Hm and Hn can be calculated using the following arithmetic expression: $\Delta Tmn=(n-m)/(c-b)\times\Delta Tbc$ (40), where $\Delta$ Tbc is head-change time difference from Hb to Hc.

More specifically, if b=0, c=7 (among eight heads), and T07=−14 μsec, time difference at the time of changing from H4 to H1 becomes $\Delta T41=(1-4)/(7-0)\times(-14)=+6$ μsec. On the other hand, time difference at the time of changing from H1 to H4 becomes $\Delta T14=(4-1)/(7-0)\times(-14)=-6$ μsec.

Figure 4:
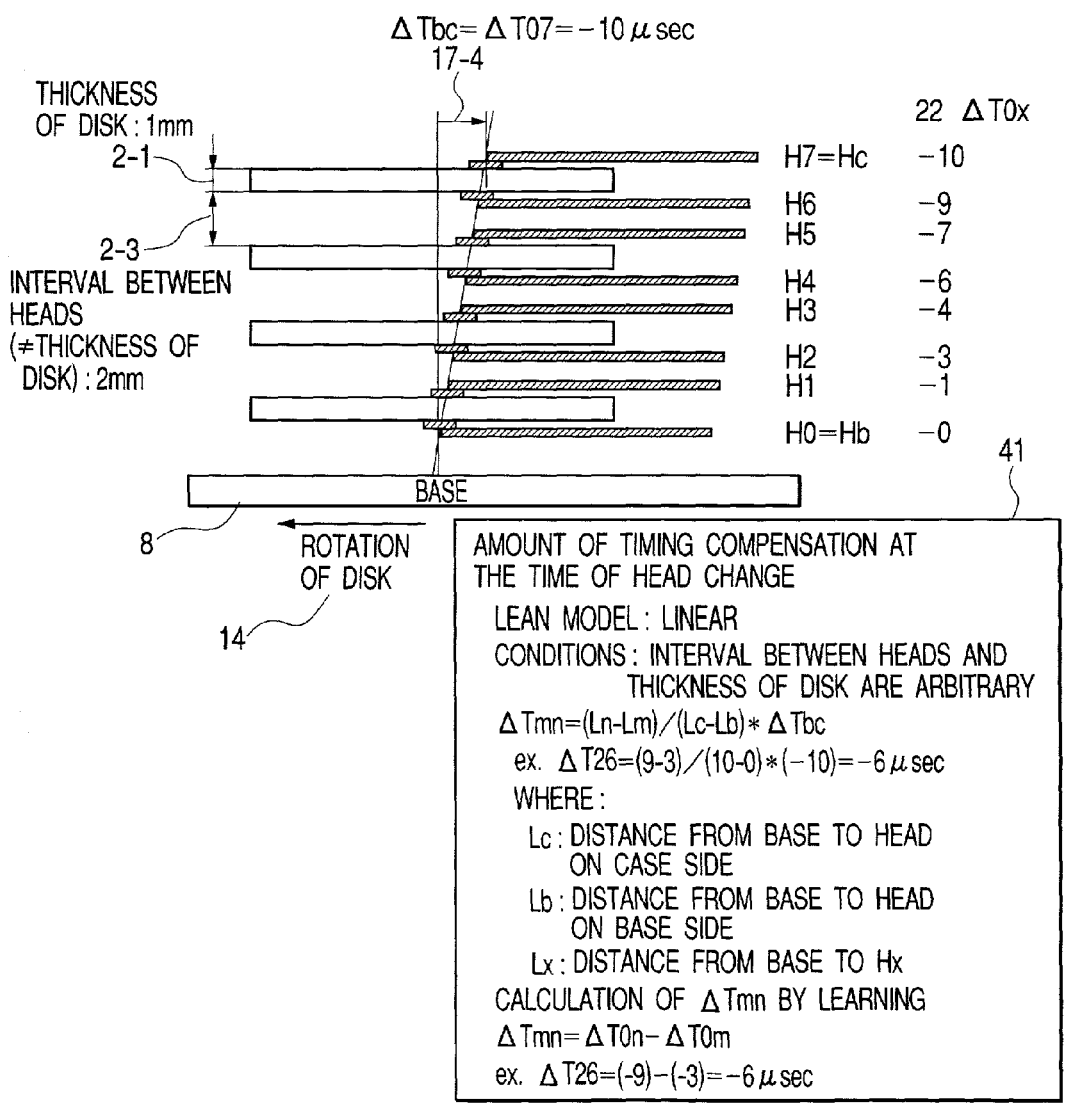
FIG. 4 is a diagram illustrating timing compensation, where actuator lean or spindle lean is expressed by a linear model.

As another example, even if a disk thickness and a disk interval are not equal to each other, it is possible to make a model easily. As shown in FIG. 4, it is based on the assumption that the number of heads is eight, a disk thickness 2-1 is 1 mm, and a disk interval 2-3 is 2 mm (an interval between H0 and H7 is 1×4+2×3=10 mm), and that an actuator has leaned rectilinearly. Under the circumstances, if a distance from the base 8 to the head on the case side (H7=Hc) is Lc, if a distance from the base 8 to the head on the base side (H0=Hb) is Lb, and if a distance from the base 8 to an arbitrary head (Hx) is Lx, head-change time difference between arbitrary heads can be expressed as follows: $\Delta Tmn=(Ln-Lm)/(Lc-Lb)\times\Delta Tbc$. In this case, it is needless to say that $\Delta Tmn=-\Delta Tnm$.

Figure 5:
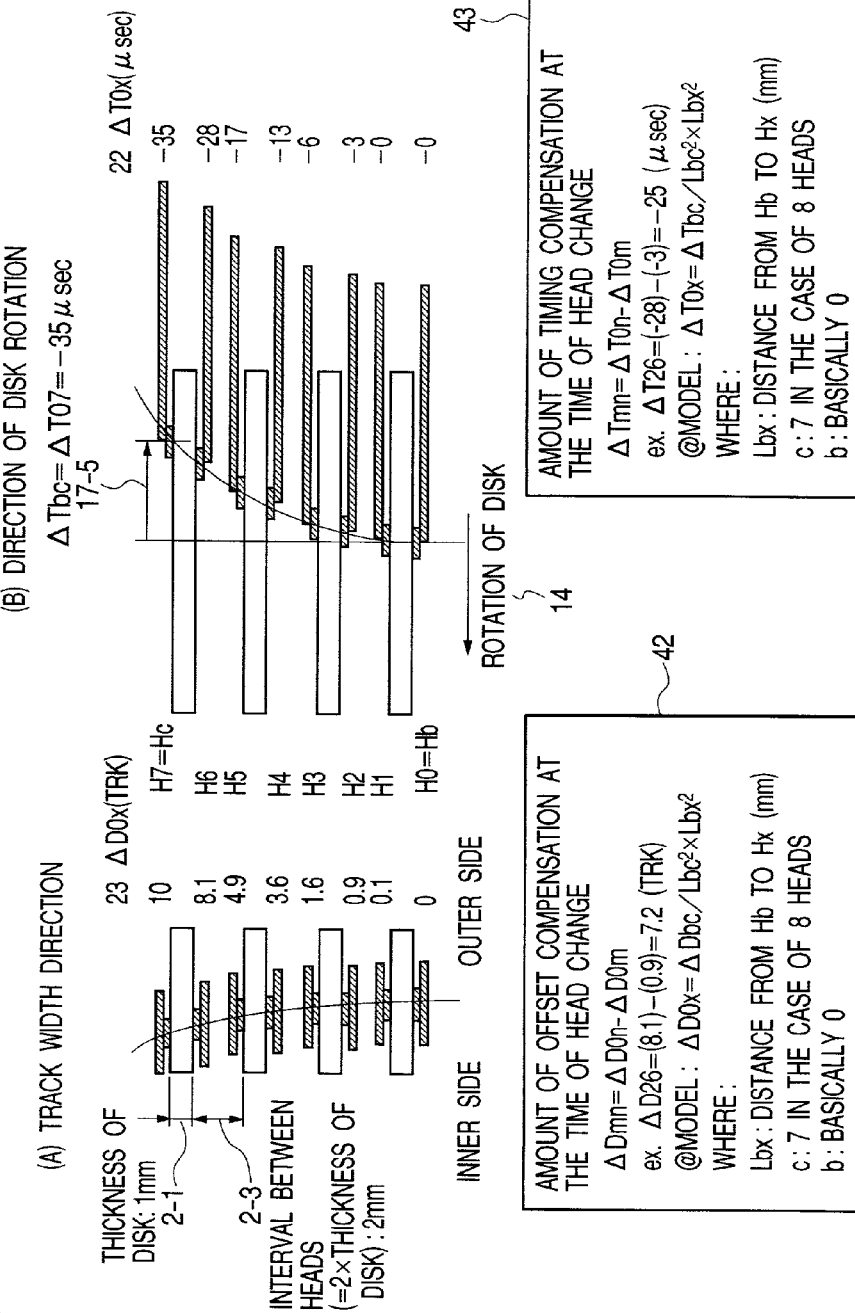
FIGS. 5(A) and 5(B) are diagrams illustrating timing compensation, where actuator lean or spindle lean is expressed by a nonlinear model.

Moreover, as another example, even if a lean profile is insufficient because of linear, it is possible to cope with it by applying nonlinear approximation. If the number of disks is large, or if the amount of lean becomes large, interpolation with sufficient accuracy becomes impossible using a linear profile. In this case, as shown in FIGS. 5(A) and 5(B), changing a lean profile model into nonlinear (in this case, second order) according to the lean quantity of the actuator enables us to cope with larger skew. The lean profile model at this time can also be supported by creating a high order profile using structure simulation. In addition, a compensation expression, etc. may also be made by performing an impact test after STW, applying a heat history, and performing others to evaluate a plurality of HDDs, of which degrees of lean are different from one another, beforehand.

The above description corresponds to procedures for learning the amount of timing compensation between heads relating to head skew. As regards the learning, compensation may be performed not only in a sequence of starting up a device or in a sequence of retry, but also during operation of the device. For example, as described above, in a configuration of two disks (four heads), there are only six ways of head change between heads ($\Delta T_{01}$, $\Delta T_{12}$, $\Delta T_{23}$, $\Delta T_{30}$, $\Delta T_{02}$, $\Delta T_{13}$). Therefore, if this memory is provided, even during operation, measuring between heads enables compensation one by one. If the number of disks is four and the number of heads is eight, 28 memories will suffice.

As shown in FIG. 2(B), servo detection timing is adjusted by a means for adjusting servo detection start time (31-1) using this learned value as described below (refer to FIG. 1).

The means for adjusting servo detection start time (31-1) refers to a stored value of the means for storing head-change time difference (30-3), and then adjusts the start time of servo signal area detecting operation in response to head change at arbitrary between-heads. In this case, if the stored value of the storage means is only time difference from a reference head (for example, $\Delta T_{0x}$), it is needless to say that operation of $\Delta Tmn = \Delta T_{0n} - \Delta T_{0m}$ is required before head change from Hm to Hn. Detection of the servo signal area after head change is performed in the timing in which this compensation value $\Delta Tmn$ is added to a period T of the servo signal area before head change. In this connection, if $\Delta Tmn$ for all between-heads is stored (for example, if the number of heads is four, the number of memories is six), it is needless to say that operation of $\Delta Tmn = \Delta T_{0n} - \Delta T_{0m}$ is not required. In this case, it is also needless to say that $\Delta Tmn = -\Delta Tnm$.

Using the means described above, at the time of head change at arbitrary between-heads, in response to time difference of the servo signal area from a proper position of the head or the disk, which has been caused by skew, start time of servo signal area detecting operation can be adjusted.

Therefore, according to this embodiment, even if comparatively large lean of an actuator shaft or a spindle shaft occurs (several percentages for axial length), it is not necessary to increase a servo signal area, and it is possible to realize a device (HDD) free from a performance loss.

Next, in this embodiment, it is also possible to cope with skew in a radius direction of a disk (hereinafter referred to as track offset). Head skew occurs in a disk radius direction simultaneously. Therefore, as is the case with learning of the amount of head skew in the disk circumference direction described above, learning of skew in the disk radius direction is also desired. The learning is effective in particular when writing and reading a comparatively large file or data, that is to say, when treating a file or data, which extends over several heads.

Figure 14:
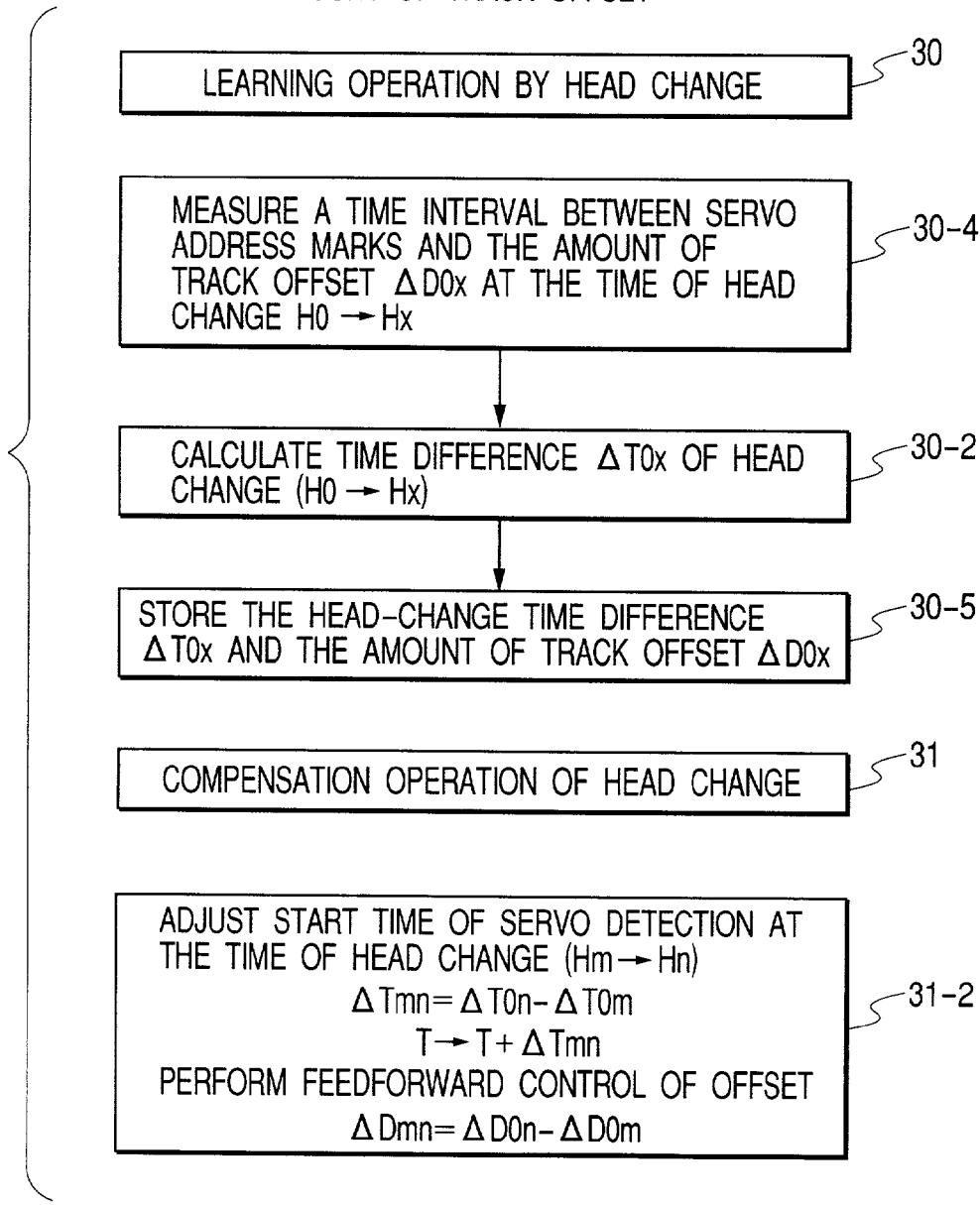
FIG. 14 is a flowchart illustrating learning of the amount of head skew of a servo signal area, and the amount of a track offset, according to the embodiment of the present invention.

More specifically, as shown in FIG. 14, this can be realized by performing the following just after head change: measuring a time interval between servo address marks; and detecting a track ID and a position error signal (PES), which are recorded in the servo signal area after head change. Using the same technique as the measurement of the amount of head skew in the disk circumference direction described above, the amount of head skew in a radius direction can be measured (30-4). Therefore, as is the case with $\Delta T0x$, storing this as $\Delta D0x$ and referring to this during usual operation enables positioning control of a head in a feed-forward manner (31-2), which permits time required for positioning after head change to be shortened.

In this connection, the amount of head skew in a radius direction between arbitrary heads, for example, the amount of head skew in a radius direction at the time of head change from Hm to Hn (offset amount), can be calculated as follows: $\Delta Dmn = \Delta D0n - \Delta D0m$.

For example, as shown in a diagram illustrating a track width direction in FIG. 5(A), a nonlinear approximation model can also be applied to a profile of $\Delta D_{0x}$. Therefore, measurement of only $\Delta D_{07}$ enables support. In this case, as shown in a diagram illustrating a disk rotation direction in FIG. 5(B), associating it with a nonlinear approximation model in a $\Delta T_{0x}$ direction makes a more preferable model.

Figure 6:
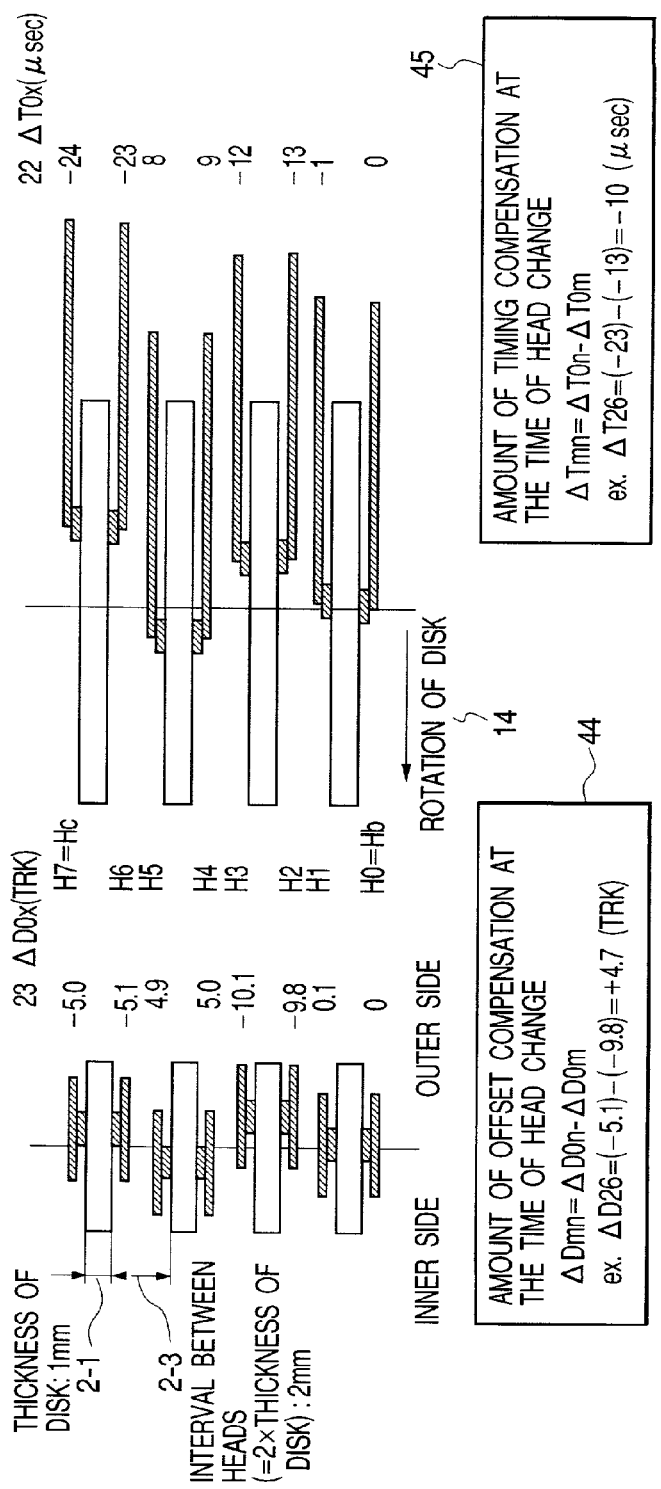
FIG. 6 is a diagram illustrating an application example in which a disk slip and head skew occur simultaneously.

Moreover, as shown in FIG. 6, when a clamp of a disk is loosen for a very short period of time due to strong outside shock, etc. in an axial direction of a spindle, a clamping torque in a rotation direction of the disk is freed. As a result of it, the disk slips in circumference and radius directions. When such shock is given, instead of a slip on a head basis, a slip on a disk basis becomes predominant. In this case, if head change causes an abnormal condition in servo detection operation for a servo signal area, various kinds of learning on a disk basis are effective. As regards memory change of $\Delta T_{0x}$, $\Delta D_{0x}$, three for each may suffice even for the case of eight heads. As a matter of course, if it is accompanied by actuator lean, or the like, seven memories for each will suffice for the case of eight heads.

According to this embodiment, both of the following can be applied to axial lean of the actuator 4 and the spindle 5 caused by large thermal shock and shock: adjustment of start timing of servo detection in a circumference direction of the disk 2; and feed-forward positioning control in a disk radius direction by estimation of the amount of head skew (off-track amount).

The various kinds of skew learning can be applied not only when starting up a HDD after shipment but also during operation of the HDD. Therefore, if contents of the memory, which are results of adaptive learning, are periodically stored in a disk or a semiconductor non-volatile memory during operation, or are stored before the HDD stops, it is not necessary to learn when starting up the HDD.

Moreover, if a correlation between a temperature, which is measured by a temperature sensor in HDA or PCB, and a learned value of the various kinds of skew is strong, it is also possible to perform compensation and adjustment of the various head skew amounts in a feed-forward manner according to the measured temperature by evaluating this relation at the time of shipment of HDD, or by monitoring the relation during true operation after the shipment.

Furthermore, performing various kinds of skew learning according to this embodiment can relax requirements of lean, etc. of an actuator and a spindle, and also enables cost reduction.

Next, servo detection control of a hard disk drive, which is built into a mobile computing device, according to a second embodiment of the present invention will be described as below. This second embodiment relates to a HDD in which the number of heads is two or more; the HDD is used in a mobile computing device such as a notebook PC.

Figure 17:
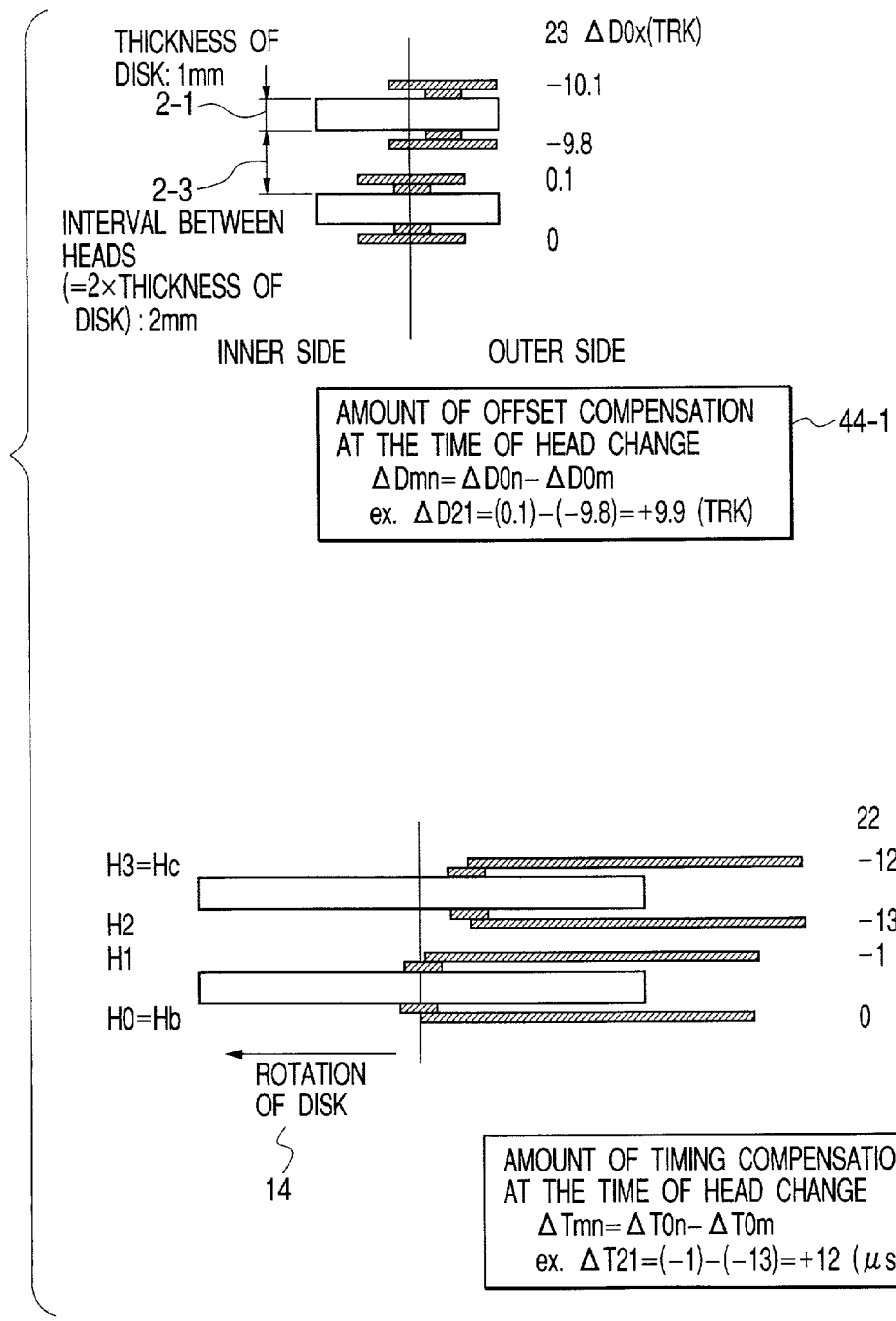
FIG. 17 is a diagram illustrating an application example corresponding to a configuration comprising two disks, which are built into a mobile computing device such as PC.

A notebook PC is apt to suffer from a strong shock at its main body as a result of its fall and rough handling because of its usage pattern. Because of it, as shown in FIG. 17, there is also a phenomenon that a fixed position of a built-in disk to a spindle deviates (in FIG. 17, for convenience of explanation, it is illustrated so that a head deviates). This is caused by a slip in a circumference direction, which mainly results from weakened fixed torque of the disk for a very short period of time. As is the case with the first embodiment described above, if there are a plurality of built-in disks, the slip of the disk causes the servo signal area 13 to deviate between disks (heads), which interferes with servo detection. In addition, even if the number of disks is one, if a suspension, on which a head is mounted, is bent by a strong shock, a head position relatively deviates between disk surfaces, causing skew in a circumference direction, and in a track width direction, of the disk.

As is the case with the first embodiment described above, in this embodiment, the amount of skew of a servo signal area between heads is learned when starting up a drive and at the time of retry processing, using a continuous search mode of servo detection. To be more specific, in this embodiment, as shown in a flowchart of FIG. 14, $\Delta T_{0x}$ and $\Delta D_{Ox}$ are learned. During operation, various kinds of compensation operation is performed using the learned values.

In this case, as regards a small HDD, which is built into a notebook PC and a mobile computing device, the number of built-in disks is generally two or less. Therefore, the means for storing head-change time difference described above may measure the amount of head skew directly between heads. If the number of heads is four, measurement in six ways ($\Delta T_{01}$, $\Delta T_{12}$, $\Delta T_{23}$, $\Delta T_{30}$, $\Delta T_{02}$, $\Delta T_{13}$) will suffice. If the number of heads is three, measurement in three ways ($\Delta T_{01}$, $\Delta T_{12}$, $\Delta T_{20}$) will suffice. Therefore, it is not necessary to identify a profile, etc.

Using the means described in the first embodiment, at the time of head change at arbitrary between-heads, in response to time difference of the servo signal area from a proper position of the head or the disk, which has been caused by skew, start time of servo signal area detecting operation is adjusted. In a similar manner, skew in the disk radius direction can be learned. It is desirable to apply adjustment of start timing of servo detection, and the amount of track offset compensation in a disk radius direction, at the same time.

Therefore, even if lean of an actuator shaft or a spindle shaft occurs (several percentages for axial length) due to an enormous shock, or even if a disk slips in a radius direction, it is not necessary to increase a servo signal area on the assumption that such a case occurs. In addition, it is possible to realize a device (HDD) free from a performance loss.

It is desirable to apply the various kinds of skew learning not only when starting up a device after shipment but also during operation of the device. Because large skew occurs during handling, it is desirable to perform such learning when starting up a HDD. Therefore, it is desirable to perform the learning during operation successively.

This can be applied to a HDD that is built into a digital camera, a pocket-type small PC, a cellular phone, a portable AV equipment, a car, etc. In addition, it is also clear that this is effective for a removable HDD, which can be connected to the equipment.

In this connection, for a HDD that is built into a mobile computing device in which a comparatively large vibration/shock may be caused during operation, the HDD is provided with a means for detecting acceleration in an operation state. Concerning head change under the condition that constant or higher acceleration is applied in an operation state, learned values relating to the various head skew amounts obtained at this time contain a large error (variation), or are greatly influenced by vibrations and a shock. Therefore, under the condition that constant or higher acceleration is applied, the learned values relating to the various head skew amounts are ignored. Or, learned values are obtained by performing head change multiple times and averaging them. If they are ignored, only learned values for head change, which are obtained under the condition that constant or lower acceleration is applied, are adopted. This enables us to minimize decrease in performance caused by learning by mistake even under environment of irregular vibrations, or even when a shock occurs.

A configuration example described below is used for solving the following problems, which occur when a servo signal is written by a STW dedicated device (servo track writer) and this disk (pre-STW disk) is built into a hard disk drive. When such a STW is used, a problem of skew between heads described above arises at the time of assembling a hard disk drive.

Such a STW dedicated device is called a media STW. As an example of the media STW, there are the following:

(1) A STW dedicated device for performing STW (pre-write STW) by a plurality of recording heads simultaneously (hereinafter referred to as media prewrite STW); in the STW dedicated device, a plurality of disks are mounted on a spindle that is mounted on a shaft of a large-scale spindle motor.

(2) A STW dedicated device for forming a servo pattern (hereinafter referred to as patterned disk STW) by the following: pressing an original form, which is a reversely configured concavo-convex form corresponding to a servo pattern, against a hard plastic disk; forming a pattern in such a manner that mass production (reproduction) of a compact disk is performed; forming a magnetic film on this plastic disk (it is also called patterned disk); and magnetizing it in a circumference direction uniformly.

(3) A STW dedicated device for forming a servo pattern by magnetic duplication (hereinafter referred to as magnetic printed media STW) by the following: configuring a soft magnetic pattern corresponding to a servo pattern in reverse on a silicon original form using lithography; putting this on a usual hard disk; and magnetizing it in a circumference direction uniformly.

Usually, the disks, on which a servo signal is recorded (formed) by these media STWs, are built into HDA one by one. Concerning the pre-STW disk subjected to STW in the device of (1), a mounted position of a head, which records a servo signal at the time of STW, is different from a mounted position of a head in a hard disk drive that is used. Therefore, skew of a servo signal area from several tens to several hundreds of $\mu$m, or skew in a track width direction (track offset), occurs between both sides of the disk.

In addition, a disk subjected to STW in the devices of (2) and (3) is usually applied to a device that uses one side of one disk. This is because it is difficult to form a servo signal for both disk sides simultaneously. In particular, skew is apt to occur in a servo signal area between both disk sides. Control of exact positioning with accuracy of several tens of $\mu$m in a rotation direction is extremely difficult. When STW is performed as a disk, which can be written and read on both sides, using a media STW device that support one side, it is assumed that skew of several servo sectors or more occurs in a rotation direction. Therefore, on both sides of the disk for which STW is performed by the devices of (2) and (3), and in HDA into which several disks are built, it is necessary to cope with skew of a very large servo signal area between heads.

Figure 7:
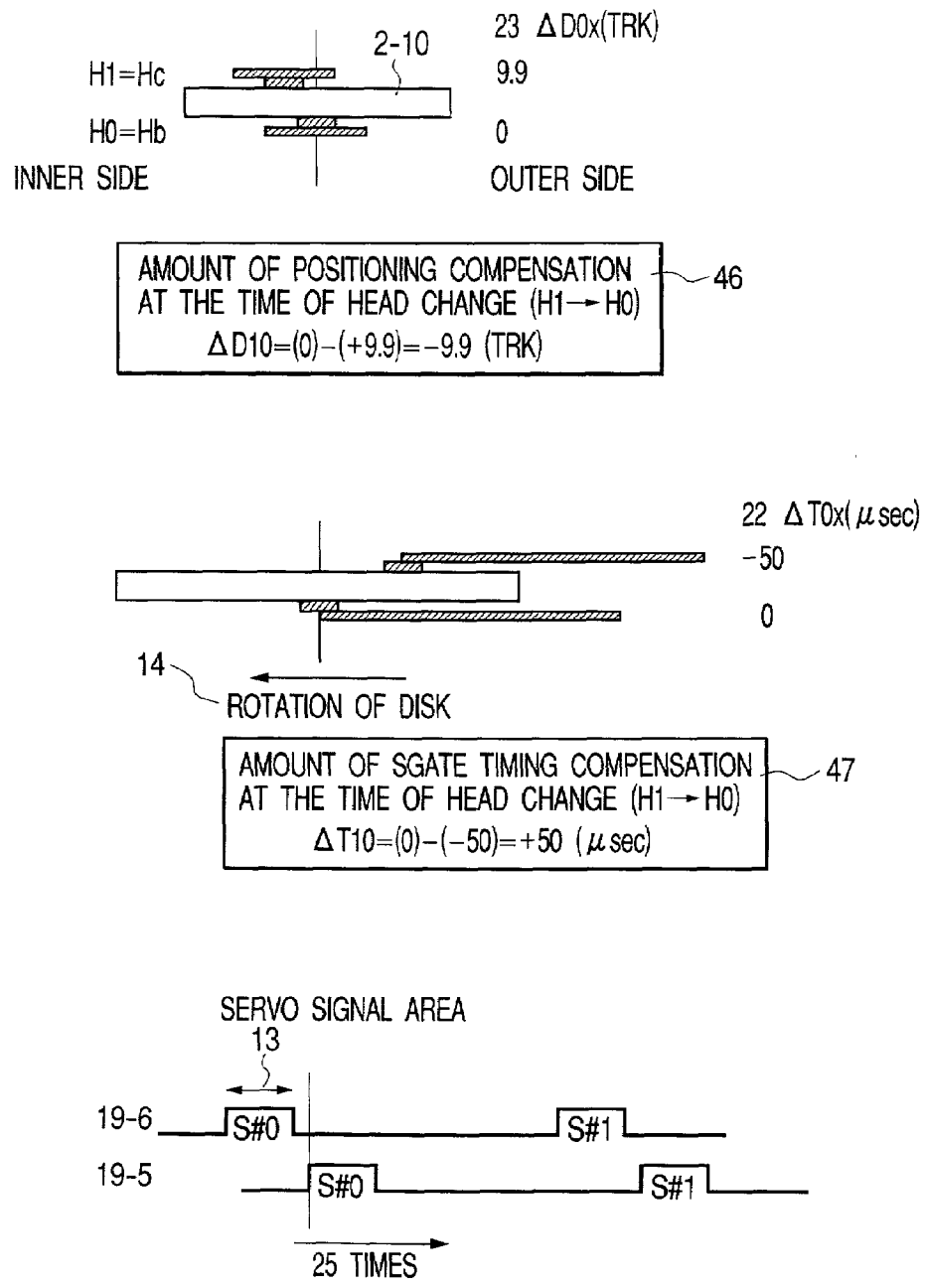
FIG. 7 is a diagram illustrating an embodiment in which one disk by a media prewrite STW is applied.

As shown in FIG. 7, if one pre-STW disk by the media prewrite STW of (1) is built into (both sides are used), the amount of head skew ($\Delta T_{Ox}$, $\Delta D_{Ox}$) is determined by an error of mounted positions between a head for recording a servo signal of STW and a head on the hard disk drive with reference to a center of a disk mounted position. Because the skew occurs in a servo signal area with a length approximately from several tens to one hundred and several tens of $\mu$m, applying the same technique as the second embodiment described above to between sides of the disk can cope with it.

However, if a plurality of pre-STW disks by media prewrite STW of (1) are built into, or if one or a plurality of patterned disk STWs of (2) is built into, or if one or a plurality of pre-STW disks by magnetic printed media STW (both sides are uses) is built into, it is necessary to cope with timing skew of several servo sectors in a servo signal area between heads.

Figure 8:
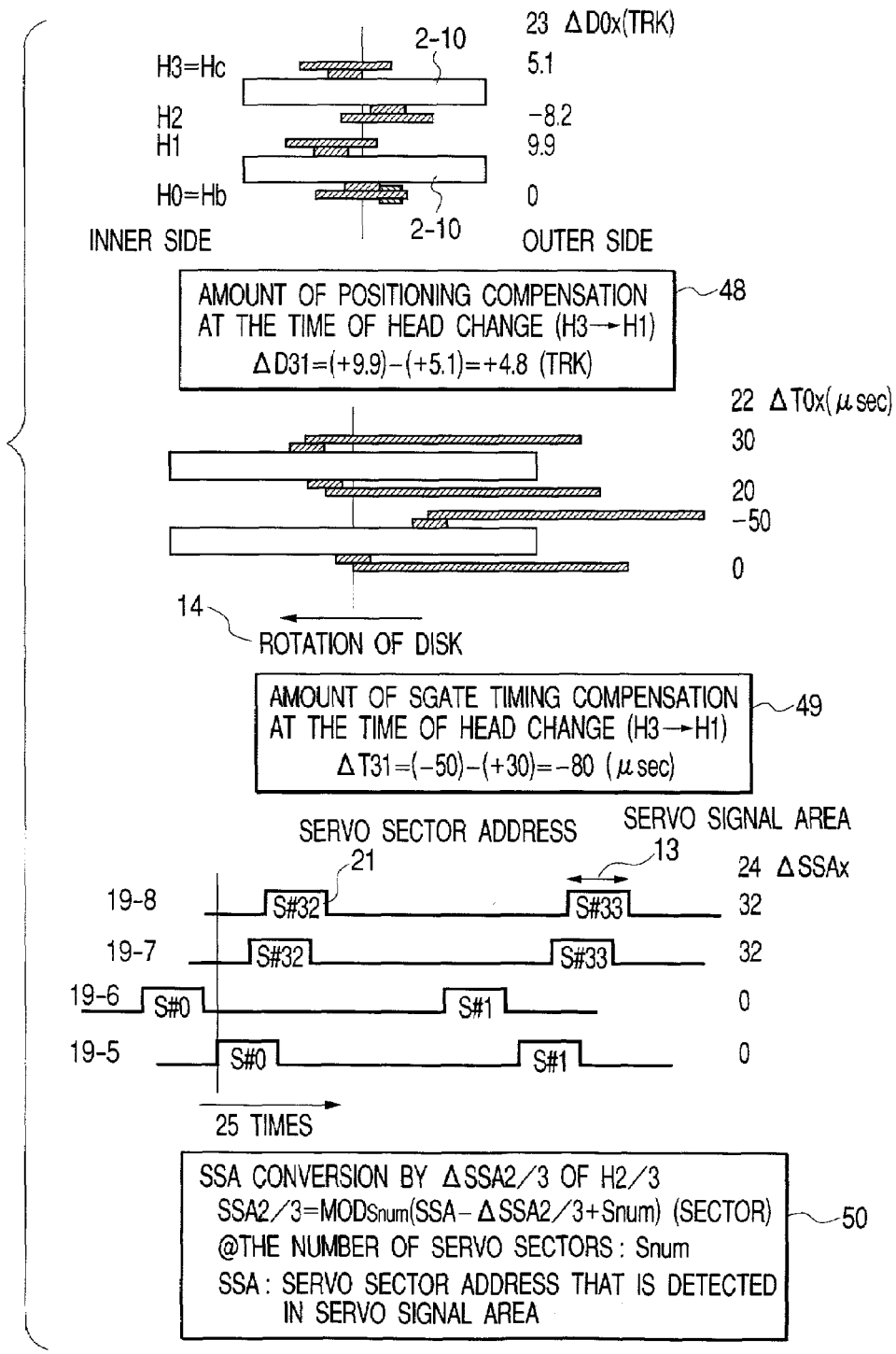
FIG. 8 is a diagram illustrating an embodiment in which two disks by a media prewrite STW are applied.
Figure 9:
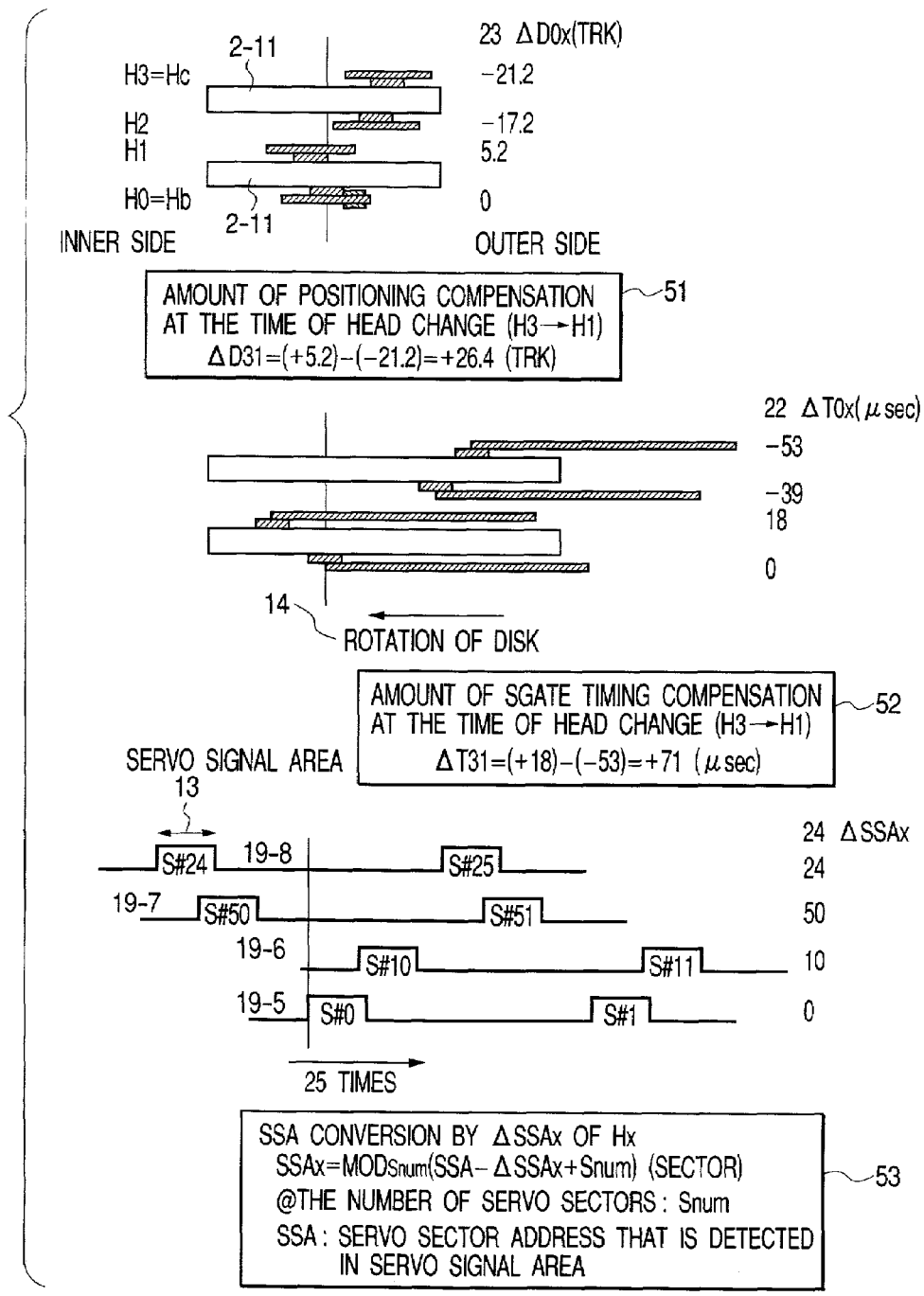
FIG. 9 is a diagram illustrating an embodiment in which two disks by a patterned disk or a magnetic printed media STW are applied.
Figure 18:
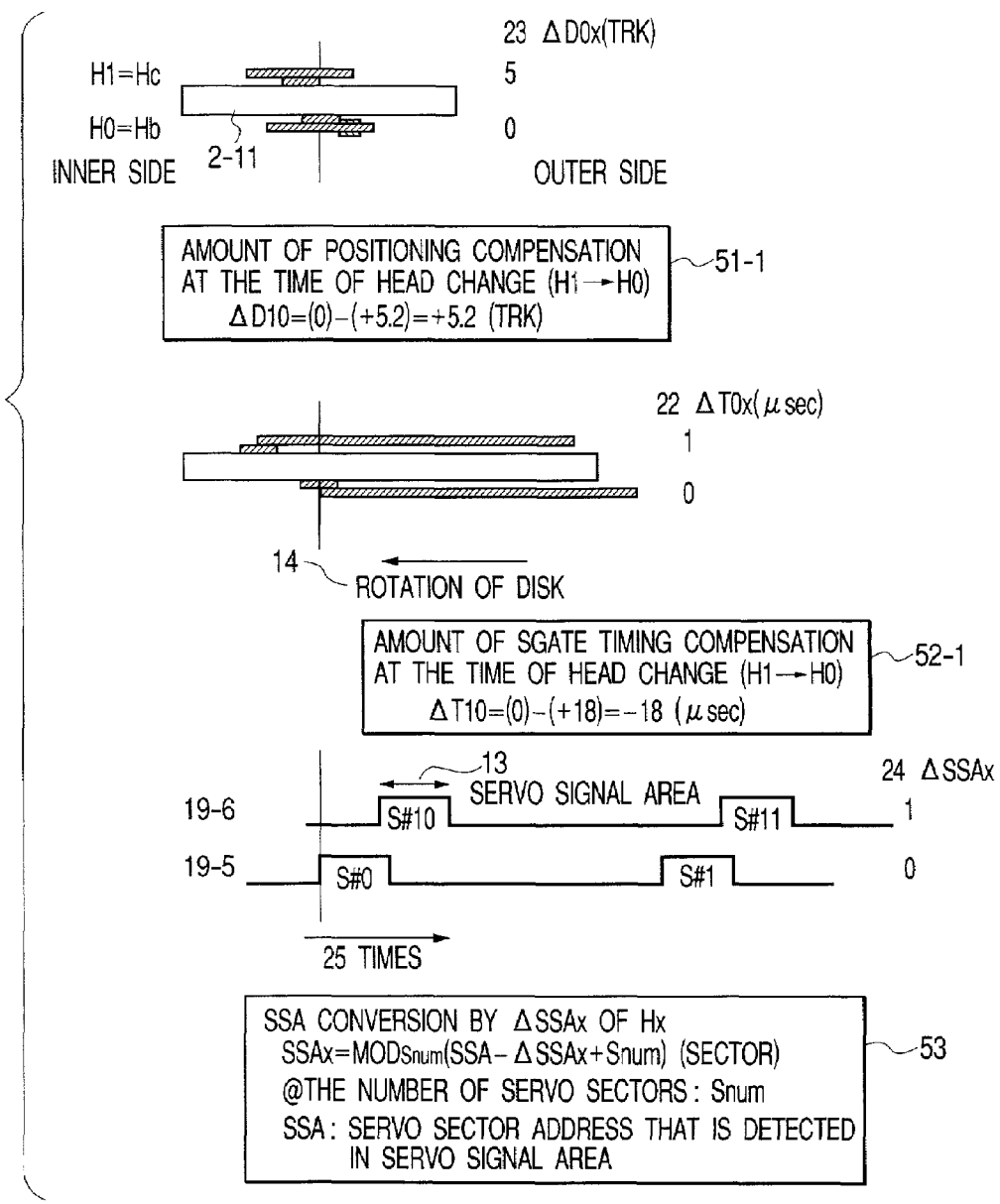
FIG. 18 is a diagram illustrating an embodiment in which one disk by a patterned disk or a magnetic printed media STW is applied.

Next, servo detection control relating to a hard disk according to a third embodiment of the present invention will be described as below. This embodiment relates to the followings: as shown in FIG. 8, a case where a plurality of pre-STW disks by a media prewrite STW are built into; as shown in FIG. 18, a case where one pre-STW disk by a patterned disk STW and a magnetic printed media STW (STW are applied to both sides) are built into; and as shown in FIG. 9, a case a plurality of pre-STW disks by the patterned disk STW and the magnetic printed media STW are built into.

Applying the media STW technique described above to the STW device enables us to reduce a STW cost per disk to a large extent. In addition to it, high quality of a servo signal can also be expected by making a dedicated device.

In this embodiment, in order to cope with skew of a servo signal area between large heads extending over several servo sectors, the following configuration is adopted.

In this embodiment, besides skew learning between heads of the servo signal area 13 (refer to the first and the second embodiments), a servo sector address (SSA), which is written in the servo signal area 13, is learned/compensated (renumbered).

FIG. 9 shows relation between each head position of HDA, into which two pre-STW disks are built, and a servo signal area on the disk. In the servo signal area 13, the servo sector address (SSA), which has been written or formed in this signal area, is shown as $S_{\#xx}$.

Figure 15:
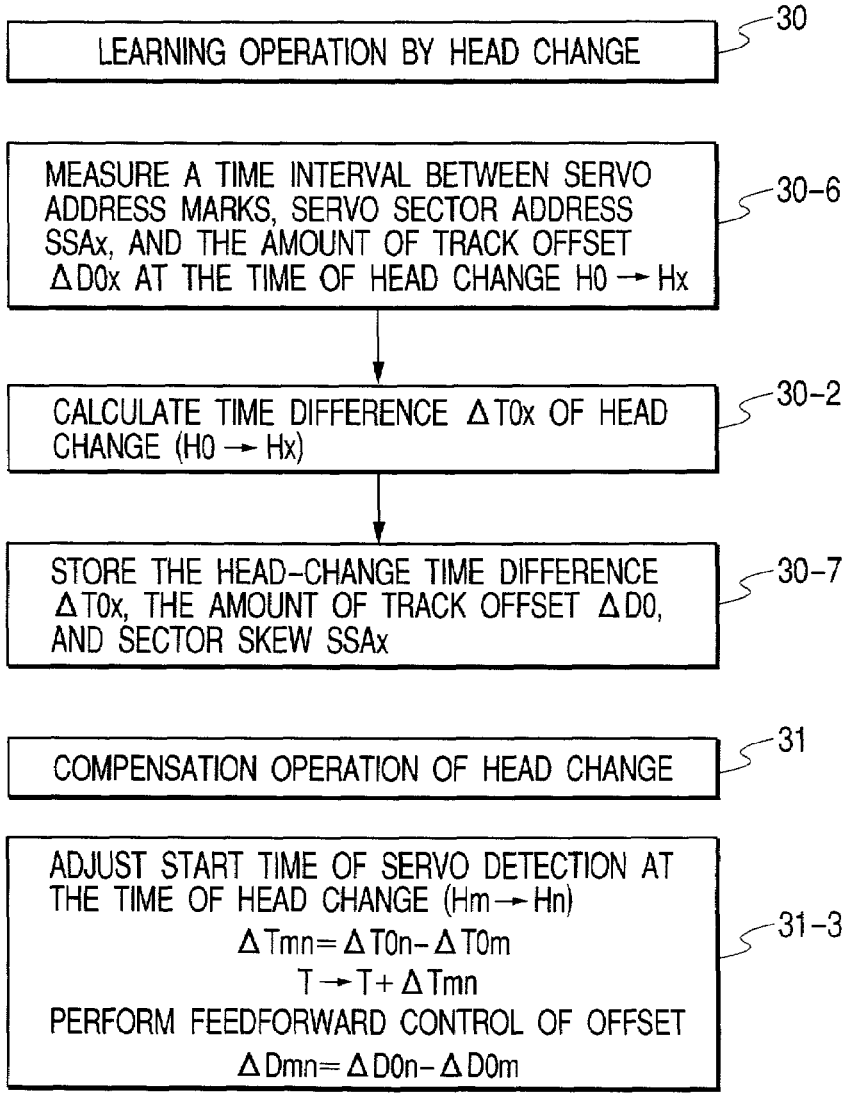
FIG. 15 is a flowchart illustrating learning of the amount of head skew of a servo signal area, the amount of a track offset, and servo sector skew, according to the embodiment of the present invention.

FIG. 15 shows learning operation and compensation operation when learning the amount of head skew of a servo signal area, the amount of a track offset, and the amount of sector skew. At first, the followings are measured (30-6): a time interval ($T_{0x}$) between servo signal areas during head change, which has been used in description of the first embodiment; the amount of servo sector skew ($\Delta SSAx$), which is written in a servo signal area by a head Hx after head change; and the amount of a track offset ($\Delta D_{0x}$) judging from a track ID and a position error signal (PES). After that, head-change time difference ($\Delta T_{0x}$) is calculated (30-2), and then $\Delta T_{0x}$, $\Delta D_{0x}$, $\Delta SSAx$ are stored (30-7).

During the compensation operation (31), $\Delta Tmn$ is calculated for each head change (Hm→Hn) to compensate detection timing (T). Then, compensation control of $\Delta Dmn$ is performed. In addition to it, a servo sector address is compensated for SSAx. In general, about a half of a servo sector period is desirable as the continuous search mode applied at this time.

Figure 16:
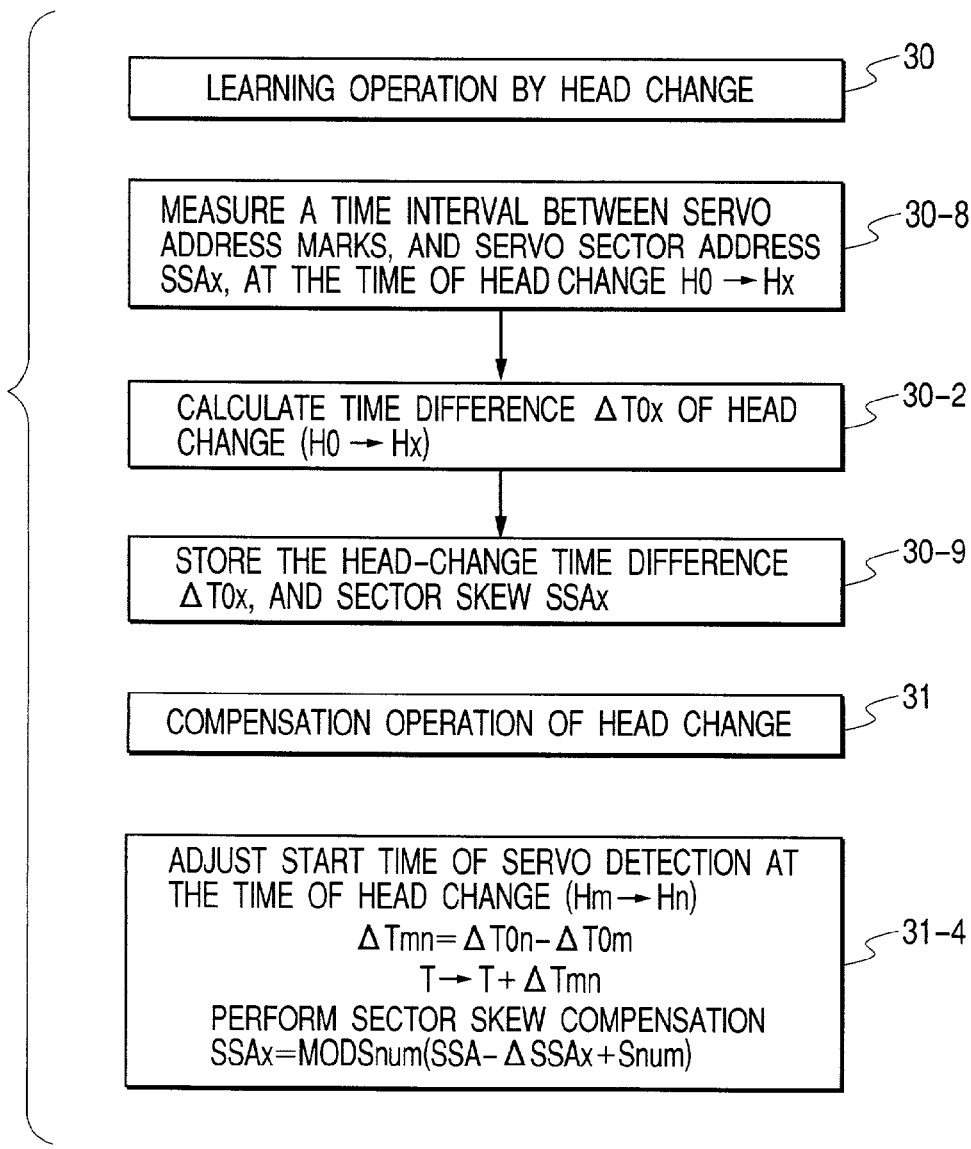
FIG. 16 is a flowchart illustrating learning of the amount of head skew of a servo signal area, and servo sector skew, according to the embodiment of the present invention.

In this case, as shown in a flowchart of FIG. 16, it is also possible to use a sequence, which does not perform compensation control of a track offset.

As shown in FIG. 8, if there is no large skew between heads (H0 and H1), SSA is detected from $S_{\#0}$ to $S_{\#1}$ when performing head change, for example, from H0 to H1. However, if there is large skew from H0 to H2 for example (in this case, 32 servo sectors) due to a pre-STW disk, SSA is detected from $S_{\#1}$ to $S_{\#33}$.

In such a case, SSA for each disk side is converted with reference to the servo sector address (SSA) detected in H0. Hereinafter, this is called skew learning (SSA learning) of a servo sector address.

More specifically, SSA (of H2)=i+1+32 is converted into SSA2=i+1. To be more specific, on the assumption that the number of servo sectors for one circuit is 100 (SSA=0 to 99), if SSA detected in H2 is converted into SSA2, the following equation is satisfied: SSA2 (of H2)=$MOD_{100}$ (SSA−32+100). In a similar manner, if SSA= 31, it is converted into SSA2=99; if SSA=32, it is converted into SSA2=0; and if SSA=33, it is converted into SSA2=1. 32 is equivalent to the amount of head skew $\Delta SSA2$ on a servo sector basis between H0 and H2. As a matter of course, SSA0 of H0 is SSA itself because $\Delta SSA0$= 0.

Figure 10:
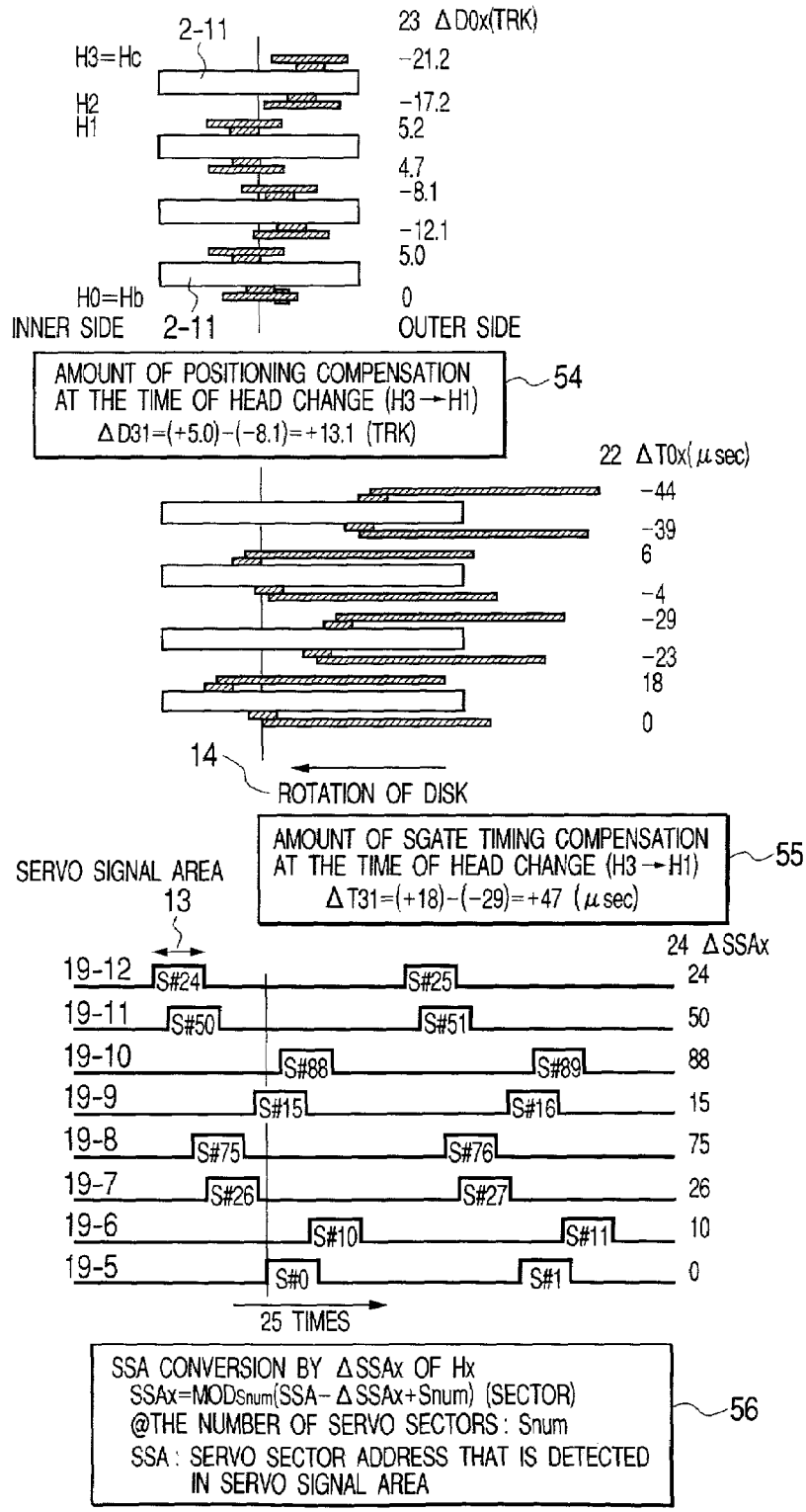
FIG. 10 is a diagram illustrating an embodiment in which four disks by a patterned disk or a magnetic printed media STW are applied.

In an example of FIG. 9, in which two patterned disks or two pre-STW disks by magnetic printed media STW are applied, large servo sector skew may occur on each disk side. In the case of FIG. 9, because $\Delta SSA3$=24, the amount of head skew on a servo sector basis between H0 and H3 becomes SSA3=$MOD_{100}$ (SSA−24+100). FIG. 10 shows an example in which four disks are used. The same application as that described in FIG. 9 is possible.

In this manner, a general equation of the servo sector address SSAx after compensation can be expressed as follows: SSAx=$MOD_{smax}$ (SSA−$\Delta$SSAx+Smax), where the number of servo sectors for one circuit is Smax, and the amount of head skew on a servo sector basis is $\Delta$SSAx. As is the case with the learning of the timing skew amount of a servo signal area (skew learning), SSA learning is performed between heads (between H0 and Hx).

At the time of head change in the hard disk drive, a value of (Smax−$\Delta$SSAx) from SSAx=$MOD_{smax}$ (SSA−$\Delta$SSAx+Smax) is changed in response to the head Hx to which head change is performed. More specifically, the following operation is performed: SSAx=$MOD_{smax}$ (SSA+ (Smax−$\Delta$SSAx)). To be more specific, for the SSA learning, at least $\Delta$SSAx or (Smax−$\Delta$SSAx) is stored for each Hx. If the number of heads is n, the required minimum number of memories for storing a result of SSA learning is n−1.

As regards the learning of various servo signal areas, if the number of heads is n, and if a reference head is H0, the required minimum number of memories for each is n−1. If there are learned values of $\Delta T_{0x}$ and $\Delta D_{0x}$ corresponding to the first embodiment 1 and the second embodiment, the number is 2×(n−1). It is to be noted that in this case, because H0 should be treated in a special manner, the number of memories may be 2×n (including H0) to simplify processing. In the case of multiple media prewrite STWs like this embodiment, or if a patterned disk/magnetic duplication disk are applied, skew of a large servo signal area occurs. Therefore, it is needless to say that memories of $\Delta$SSAx are required.

Moreover, it is possible to have the large effect of adopting the pre-STW disk, to which this embodiment is applied, for a HDD that is built into a mobile computing device, where a comparatively great vibration/shock may occur during operation, and that requires low cost in particular. In this case, the HDD is provided with a means for detecting acceleration in an operation state. If head change under the condition that constant or higher acceleration is applied is detected, instantaneous values relating to the various head skew amounts obtained at this time are judged to have a large error (variation) or to be greatly influenced by vibrations and a shock. Therefore, the learned values for the various head skew amounts are ignored, or the learned values are obtained by averaging head change performed multiple times. If they are ignored, only learned values for head change, which are obtained under the condition that constant or lower acceleration is applied, are adopted. This enables us to minimize decrease in performance caused by learning by mistake even under environment of irregular vibrations, or even when a shock occurs.

In this connection, it is possible to cope with a variation in rotation of a disk by adding an acquisition area of a servo signal. A length of this added area decreases as the number of servos per circuit increases. Therefore, a loss of data format due to the length of this added area does not depend on the number of servos per circuit. Even if the variation in rotation is ±0.1%, the loss is 0.2% at most, which can be almost ignored.

As described above, the hard disk drive according to the embodiments of the present invention is mainly characterized in that the hard disk drive comprises a timing learning means and a timing compensation means. Said timing learning means comprises: a servo sector interval measuring means for measuring an interval of servo signal areas, which may occur at the time of head change between heads; a time difference calculating means for calculating head-change time difference from the value measured by the servo sector interval measuring means; and a time difference storage means for storing a result of the calculation by the time difference calculating means. Said timing compensation means is used for compensating start timing of servo detection after head change using the stored value of the time difference storage means. Moreover, in addition to the learning of the timing skew amount of the servo signal area described above, the hard disk drive is provided with a means for learning the timing skew amount of a servo sector address, that is to say, a servo sector address converting means that converts a physical address of a servo sector, for which servo detection has been performed, for each head or disk, and that adjusts timing on a servo sector address basis.

Furthermore, learning a track ID and positioning, which have been detected, after head change among a plurality of heads, and then compensating positioning control according to the learned values in a feed-forward manner, permit time required for positioning after head change to be improved (shortened).

According to the present invention, it is possible to realize a hard disk drive characterized in that even when large skew of a disk or a head occurs due to a thermal shock, an outside shock, or the like, a servo signal area is not extended, and a performance loss caused by head change is not produced.

Moreover, it is possible to realize a hard disk drive characterized in that even if a hard disk (it is called pre-STW disk), on which a servo signal has been written or formed beforehand, is built into a device, when large skew of the disk, which extends from several to several hundred servo signal areas, occurs among a plurality of heads/disks, a format loss is minimized and there is no performance loss.

What is claimed is:

1. A servo detection control system comprising:
    a head change learning means including:
        a means for measuring a servo sector interval, which occurs at the time of head change;
        a means for calculating a head-change time difference from a value measured by the servo sector interval measuring means; and
        a means for storing a result of calculation by the calculating means;
    a means for compensating a start timing of servo detection after head change using a stored value of the storing means;
    wherein the head change learning means further comprises a means for measuring the amount of head skew in a disk radius direction using a writing signal in a servo sector after the head change;
    a means for storing the amount of head skew; and
    a means for controlling feed-forward positioning of the head using the amount of head skew.

2. A servo detection control system according to claim 1, wherein:
    the means for storing a result of calculation is the same means as the means for storing the amount of head skew.

3. A servo detection control system comprising:
    a head change learning means including:
        a means for measuring a servo sector interval, which occurs at the time of head change;
        a means for calculating a head-change time difference from a value measured by the servo sector interval measuring means; and
        a means for storing a result of calculation by the calculating means; and
    a means for compensating start timing of servo detection after head change using a stored value of the storing means;
    wherein the head change learning means further comprises a means for measuring the amount of head skew in a disk radius direction using a writing signal in a servo sector after the head change; and
    wherein the head change learning means further comprises a means for measuring the amount of servo sector skew using a servo sector address after the head change.

4. A servo detection control system according to claim 3, further cormprising:
    a means for storing the amount of servo sector skew; and
    a means for compensating and controlling a servo sector address using the amount of servo sector skew.

5. A servo detection control system according to claim 4, wherein:
    the means for storing a result of calculation is the same means as the means for storing the amount of servo sector skew.

6. A servo detection control method comprising:
    measuring a servo sector interval, which occurs at the time of head change among a plurality of heads;
    calculating a head-change time difference form the measured value; and
    compensating a head-change time difference from the measured value;
    compensating a start timing of servo detection after head change using the result of calculation;
    measuring an amount of head skew in a disk radius direction using a writing signal in a servo sector after the head change; and
    controlling feed-forward positioning of a head using the amount of head skew and the time difference.

7. A servo detection control method comprising:
    measuring a servo sector interval, which occurs at the time of head change among a plurality of heads;
    calculating head-change time difference from the measured value;
    measuring the amount of servo sector skew using a servo sector address after the head change; and
    compensating and controlling the servo sector address using the amount of servo sector skew and the time difference.

8. A hard disk drive comprising:
    a rotary storage medium storing user data and a servo signal;
    a head reading the user data and the servo signal, which have been written by the medium;
    an actuator driving the head;

a controller learning driving of the actuator, said controller including:
- a circuit measuring a servo sector interval, which occurs in a change of the head;
- a calculator which calculates a head-change time difference from a value measured by the interval measuring circuit; and
- a memory for storing a result of calculation of the calculator;

a circuit compensating start timing of servo detection after changing the head using a stored value of the memory;

a sensor detecting a shock from outside; and a circuit for judging whether or not a result of learning by the controller is adopted, using an output of the sensor.

9. A hard disk drive according to claim 8, wherein:
the controller further comprises a circuit measuring the amount of head skew in a radius direction of the medium using a writing signal in a servo sector after changing the head.

10. A hard disk drive according to claim 8, further comprising:
- a memory storing the amount of head skew; and
- a second controller positioning of feed-forward of the head using the amount of head skew.

11. A hard disk drive according to claim 10, wherein:
the memory storing a result of calculation is the same memory as the memory storing the amount of head skew.

12. A hard disk drive according to claim 8, wherein:
the controller further comprises a circuit measuring the amount of servo sector skew using a servo sector address after changing the head.

13. A hard disk drive according to claim 12, further comprising:
- a memory storing the amount of servo sector skew; and
- a second controller compensating and controlling a servo sector address using the amount of servo sector skew.

14. A hard disk drive according to claim 13, wherein:
the memory storing a result of calculation is the same memory as the memory storing the amount of servo sector skew.

15. A hard disk drive according to claim 8, wherein:
a continuous search mode is applied during learning operation of the controller.

16. A hard disk drive according to claim 8, wherein:
a continuous search mode is applied during compensation and control operation of the circuit compensating start timing.

* * * * *